(12) United States Patent
Kordt

(10) Patent No.: US 11,104,420 B2
(45) Date of Patent: Aug. 31, 2021

(54) SYSTEM AND METHOD FOR MINIMISING BUFFETING

(75) Inventor: Michael Kordt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 932 days.

(21) Appl. No.: 13/641,918

(22) PCT Filed: Apr. 26, 2011

(86) PCT No.: PCT/EP2011/056514
§ 371 (c)(1),
(2), (4) Date: Dec. 19, 2012

(87) PCT Pub. No.: WO2011/134924
PCT Pub. Date: Nov. 3, 2011

(65) Prior Publication Data
US 2013/0206916 A1    Aug. 15, 2013

Related U.S. Application Data

(60) Provisional application No. 61/328,690, filed on Apr. 28, 2010.

(30) Foreign Application Priority Data

Apr. 28, 2010    (DE) ...................... 10 2010 028 311.8

(51) Int. Cl.
*B64C 13/16*    (2006.01)
*B64C 9/34*    (2006.01)

(52) U.S. Cl.
CPC ................ *B64C 13/16* (2013.01); *B64C 9/34* (2013.01); *Y02T 50/30* (2013.01); *Y02T 50/40* (2013.01)

(58) Field of Classification Search
CPC . B64C 13/16; B64C 9/34; Y02T 50/32; Y02T 50/44
USPC .......................................... 244/113, 195, 204
See application file for complete search history.

(56) References Cited

U.S. PATENT DOCUMENTS

| | | | |
|---|---|---|---|
| 2,885,161 | A | 8/1948 | Kerker et al. |
| 4,706,902 | A | 11/1987 | Destuynder et al. |
| 5,549,260 | A * | 8/1996 | Reed, III ...................... 244/195 |
| 2003/0205644 | A1* | 11/2003 | Najmabadi et al. .......... 244/195 |
| 2008/0255713 | A1* | 10/2008 | Onu et al. ......................... 701/3 |
| 2010/0243818 | A1* | 9/2010 | Schulein ....................... 244/204 |
| 2010/0327107 | A1* | 12/2010 | Featherstone ............... 244/3.24 |

FOREIGN PATENT DOCUMENTS

DE    1269496 A    2/1967

OTHER PUBLICATIONS

German Office Action and English Translation for Application No. 10 2010 028 311.8, dated Jun. 3, 2016.

* cited by examiner

*Primary Examiner* — Valentina Xavier
(74) *Attorney, Agent, or Firm* — Greer, Burns & Crain, Ltd.

(57) ABSTRACT

A system and method for minimizing buffeting in the case of an aircraft. Buffeting load control elements are provided in airfoils of the aircraft are arranged to be at least partly moved out of the airfoils by a control to reduce buffeting loads acting on the aircraft.

12 Claims, 10 Drawing Sheets

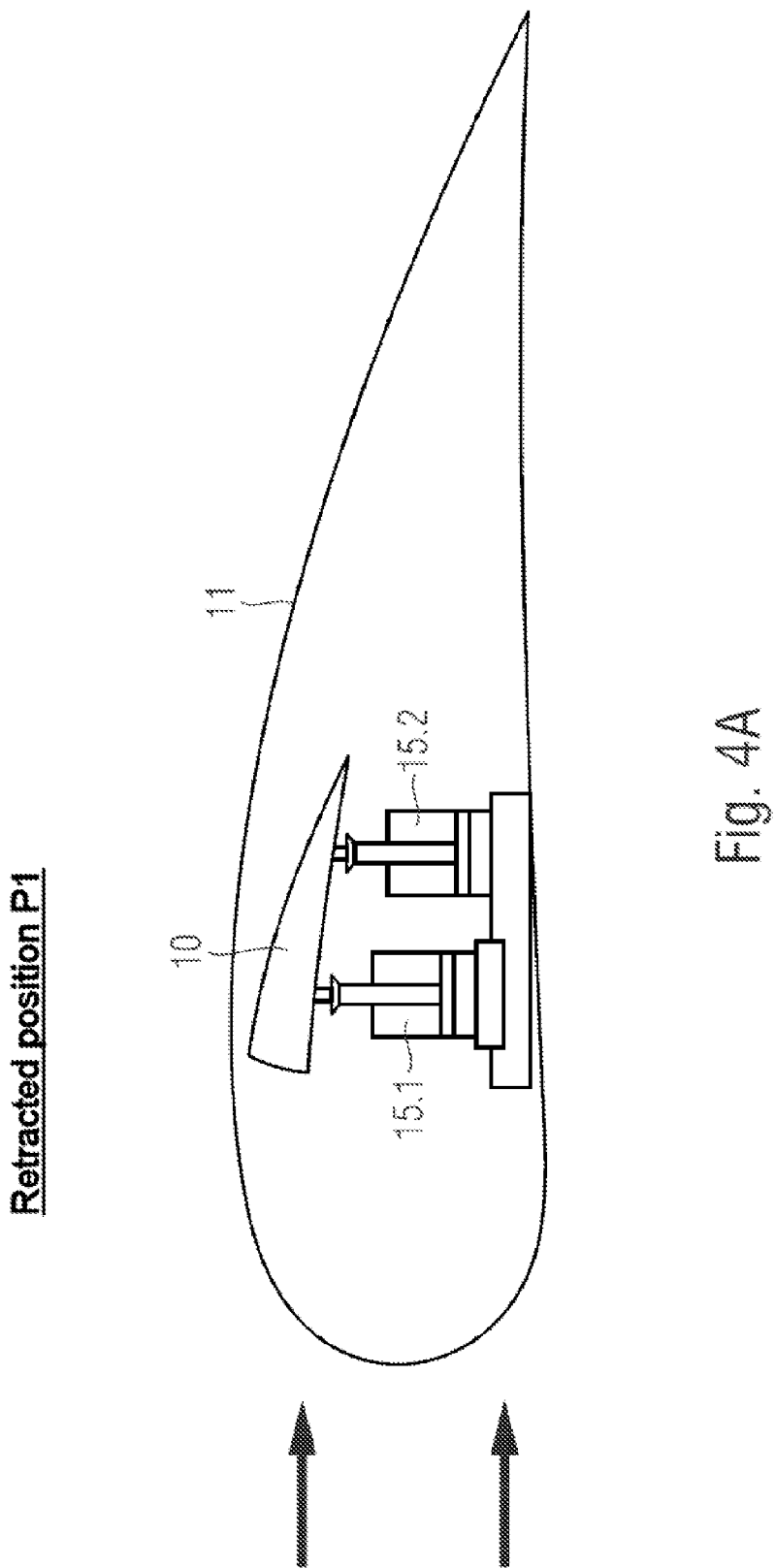

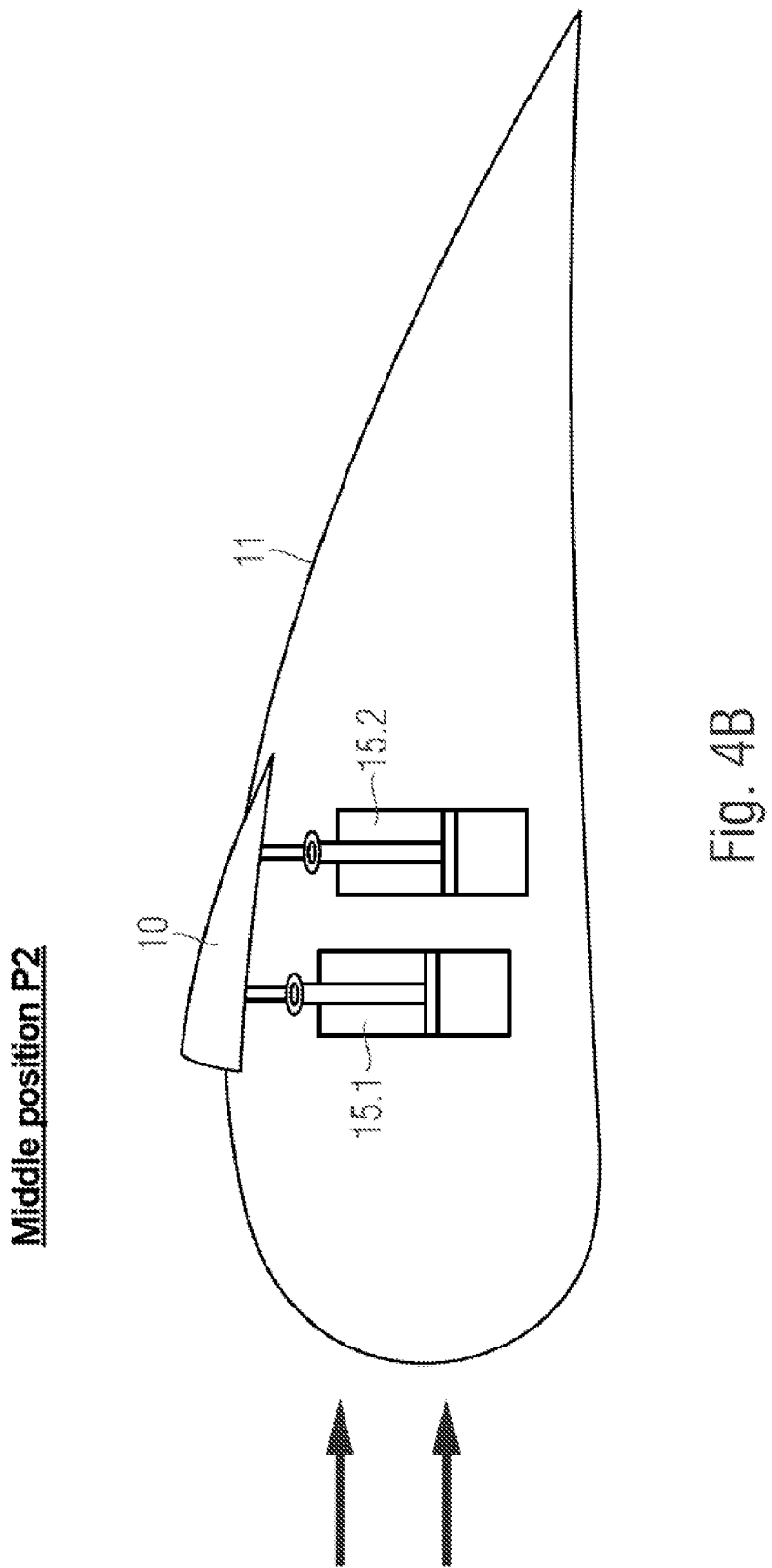

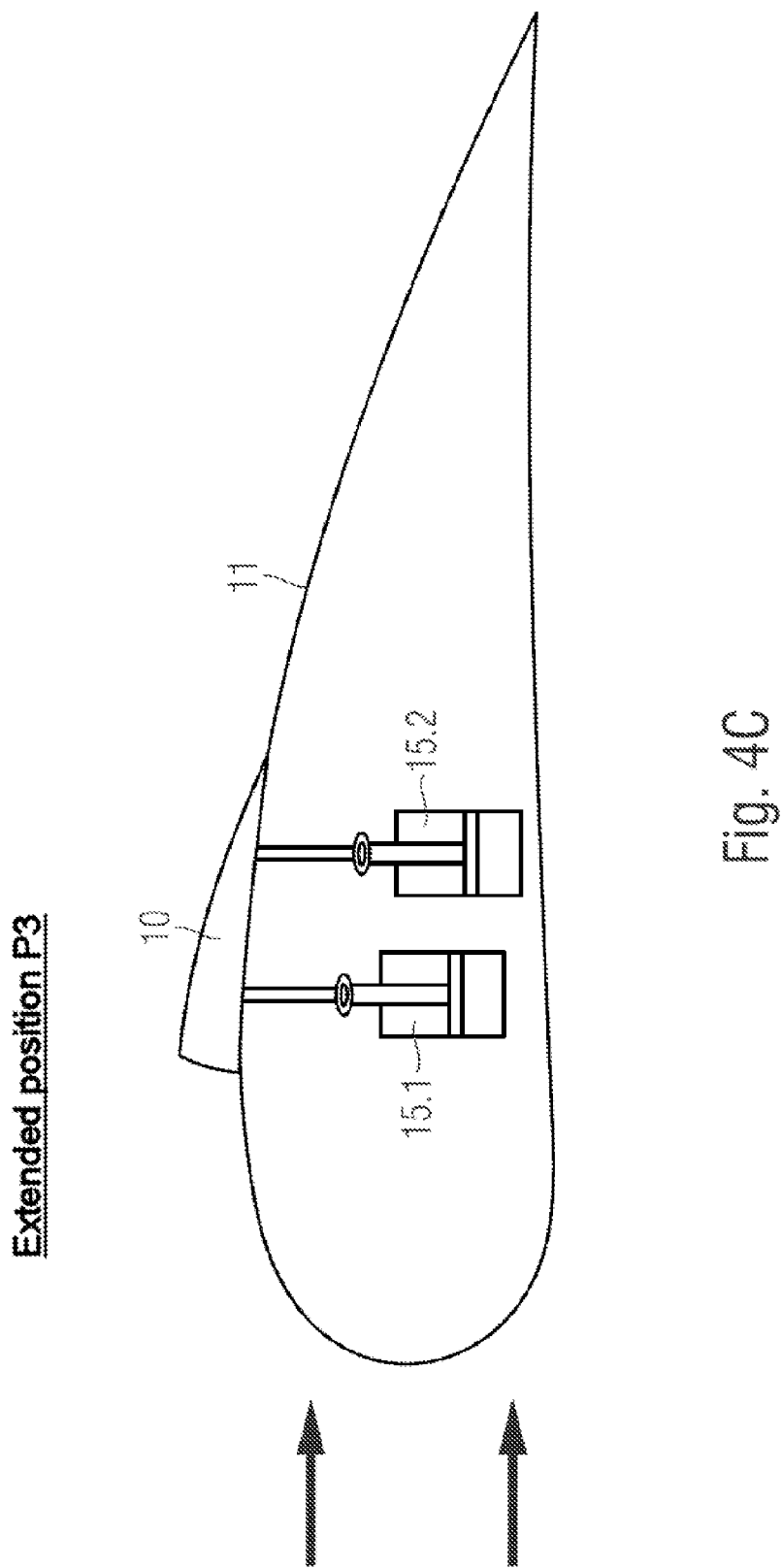

SYSTEM AND METHOD FOR MINIMISING BUFFETING

CROSS-REFERENCE TO RELATED APPLICATIONS

The present Application is a national stage application filed under 35 U.S.C. 371 of PCT/EP2011/056514 filed on Apr. 26, 2011, which claimed priority to DE 10 2010 028 311.8 filed on Apr. 28, 2010 and U.S Provisional Patent Application No. 61/328,690 filed on Apr. 28, 2010, both of which are hereby incorporated by reference as if fully set forth herein.

BACKGROUND OF THE INVENTION

The invention relates to a system and a method for minimizing buffeting loads in the case of an aircraft, particularly a passenger aircraft.

During flight operation, aircraft are exposed to various forces. Influencing variables in this respect are the lifting forces generated by the airfoils, the aerodynamic resistance of the aircraft, the weight or gravitational force acting on a centre of gravity of the aircraft, the thrust generated by the engines, the stick forces generated on the control surfaces of the aircraft and the torques generated by the respective forces. The mass inertia of the aircraft or the mass inertia of the aircraft components also plays a part in the above-mentioned forces. Flight maneuvers and air turbulence produce structural loads on the aircraft which fundamentally configure the structure of the aircraft or are to be fundamentally considered in the aircraft construction and in strength verification. Furthermore, the loads which occur in so-called buffeting can also be a determining factor for the configuration of parts of the aircraft structure.

"Buffeting" is generally identified as a shaking or vibrating of airfoils. Depending on the cause, it is possible to differentiate here between vibrations induced by gusts of wind, vibrating airfoils due to a partially separating flow before the so-called stall (low speed buffet) or transonic buffeting (high speed buffet). As the speed of the aircraft decreases, to maintain the lift, the angle of attack of the aircraft and thus of its airfoils is increased to an ever greater extent. In this respect, angles of attack can be achieved in which a relatively low-energy boundary layer on the upper side of the wing can no longer overcome the pressure maximum after passing through a pressure minimum. The flow then separates upstream of the rear edge of the wing. The unstable separation point can rapidly drift backwards and forwards in a specific region. Due to this drifting movement of the separation point, the pressure distribution and thus the position and magnitude of the resulting compressive force are constantly changing. This produces a turbulent wake downstream of the wing. Since in many aircraft the tailplane is located in this turbulent wake, the tailplane can consequently undergo more or less irregular vibrations, which are called buffeting (vibrations). Inasmuch as the vibrations lead to significant mechanical stresses, it is essential that they are considered in the construction of aircraft. Furthermore, buffeting (vibrations) adversely affect passenger comfort.

U.S. Pat. No. 4,706,902 describes a method for reducing load forces which are caused by buffeting and act on a wing. In this respect, at least one parameter is continuously measured, the amplitude, frequency and phase of which constitutes the buffeting and is moved to reduce the buffeting as a function of the measuring signal of the control surfaces fitted to wings of the aircraft. If sensor signals picked up by detectors exceed a specific threshold, a control signal is sent to the control surfaces to minimize the buffeting.

However, the system in U.S. Pat. No. 4,706,902 suffers from a serious disadvantage. The control surfaces are used to control the movement of the aircraft, i.e. their movement serves in particular to generate stick forces which alter the direction of movement of the aircraft. Thus, for some flight maneuvers it is impossible to move the control surfaces to reduce buffeting because the control surfaces are being used at that moment to change the direction of movement of the aircraft. Furthermore, control surfaces are also used to reduce gust and maneuvering loads, to improve comfort and safety and to increase stability, so that consequently the use of the control surfaces to reduce buffeting loads is restricted even further.

SUMMARY OF THE INVENTION

Therefore, the object of the present invention is to provide a method and a device, in which device load forces caused by buffeting are reduced as far as possible independently of a flight maneuver and independently of simultaneous gust effects in any flight phase of the aircraft.

The greatest possible reduction in the load forces also implies an extensive reduction in vibrations and thus an increase in passenger comfort.

This object is achieved according to the invention by a system for minimizing buffeting in the case of an aircraft, which system has the features stated in claim 1.

The invention provides a system for minimizing buffeting in the case of an aircraft, in which system buffeting load control elements provided in airfoils of the aircraft can be at least partly extended by a control means for reducing buffeting loads on the airfoils, which buffeting loads act on the aircraft.

The buffeting control elements are accommodated such that they can be lowered into the airfoils of the aircraft.

If required, the buffeting control elements can be at least partly moved out of the airfoils to reduce the buffeting loads which act on the aircraft.

The buffeting load control elements are fin-shaped webs similar to a shark fin projecting out of the water. To minimize the buffeting loads during flight operation, the buffeting control elements are moved out of the upper surface of the aerofoil. These fin-shaped buffeting load control elements are novel components which have not been previously used in aircraft construction.

Thus, the invention also provides a buffeting load control element for an aircraft which can be at least partly moved out of an aerofoil of the aircraft to reduce buffeting loads acting on the aircraft.

This buffeting load control element is preferably a fin-shaped, sturdy web which is preferably in the shape of a flattened shark fin.

In an embodiment of the system according to the invention for minimizing buffeting, the aircraft has flight phase sensors for detecting different flight phases of the aircraft. The flight phases can be established by flight parameter intervals. Examples of these flight parameters are flight speed, flight altitude, angle of attack or position of the high-lift system.

In an embodiment of the system according to the invention for minimizing buffeting, one or more buffeting load control elements are provided in each case in a region of the aircraft structure in which a load acting thereon is almost constant. A structural region of this type can also be called a load station.

In an embodiment of the system according to the invention for minimizing buffeting, the control means has a memory which stores information for different flight phases during a flight operation of the aircraft for all buffeting load control elements of the aircraft concerning whether or not the respective buffeting load control element is to be moved out of the aircraft aerofoil during flight operation in the respective flight phase.

In a possible embodiment of the system according to the invention for minimizing aircraft buffeting, each buffeting load control element can be actuated between a first retracted position, a second middle, partly extended position and a third fully extended position.

In a possible embodiment of the system according to the invention for minimizing aircraft buffeting, the buffeting load control element is moved into the second middle, partly extended position when the respective buffeting load control element is to be moved out of the aerofoil in the current flight phase of the aircraft.

In a possible embodiment of the system according to the invention for minimizing aircraft buffeting, provided on the structural regions of the aircraft are load sensors which detect a current load acting on the respective structural region during flight operation of the aircraft and, as a function of the detected load, buffeting load control elements provided for the structural region are moved adaptively between the second middle, partly extended position and the third fully extended position to minimize the load currently acting by buffeting on the respective structural region.

In a possible embodiment of the system according to the invention for minimizing buffeting, a calculation unit of the control means calculates the degrees of extension for the buffeting load control elements in real time and the buffeting load control elements are moved out of the airfoils according to the calculated degrees of extension to minimize the buffeting-induced turbulence.

In a possible embodiment of the system according to the invention for minimizing buffeting, the calculation unit of the control means further governs amplitudes for control surfaces which are provided on the airfoils of the aircraft, these control surfaces being adjusted statically or dynamically according to the calculated control surface amplitudes to minimize the buffeting-induced vibrations.

In an embodiment of the system according to the invention, the airfoils of the aircraft include wings as well as tailplanes and rudder units of the aircraft.

In a possible embodiment of the system according to the invention, the control surfaces are elevators on the tailplane of the aircraft. These control surfaces are used simultaneously together with the buffeting load control elements on the wing or simultaneously with the buffeting load control elements on the wing and the tailplane.

In a possible embodiment of the system according to the invention for minimizing buffeting, calculated during a flight testing phase of the aircraft using a stochastic, non-linear dynamic model of the aircraft and sensorially detected buffeting characteristic quantities for each flight phase and for each structural region of the aircraft affected by buffeting is a probability that a predetermined maximum load will be reached during a total operation period of the aircraft in the respective structural region of the aircraft. Thus, during flight testing, the already high safety standards (for aircraft construction and aircraft configuration and for strength verification) and comfort standards can be further optimized for the series production aircraft.

In a possible embodiment of the system according to the invention for minimizing buffeting, as a function of the calculated probabilities, a buffeting load control element which reduces a buffeting load on a structural region of the aircraft, the calculated probability of which exceeds a predetermined probability threshold value, is stored as a buffeting load control element in the memory of the control means, which buffeting load control element is to be moved out of the aerofoil during normal flight operation of the aircraft.

The invention further provides a method for minimizing buffeting loads in the case of an aircraft, the buffeting loads acting on the aircraft being reduced by moving buffeting load control elements out of airfoils of the aircraft.

The method according to the invention is preferably carried out by a control means in real time which is integrated in the aircraft. In a possible embodiment, this control means has at least one microprocessor which implements a corresponding control program in real time. In an alternative embodiment, the control means is hard-wired and has, for example, a custom integrated circuit ADIC.

BRIEF DESCRIPTION OF THE DRAWINGS

In the following, embodiments of the system and method according to the invention for minimizing aircraft buffeting are described with reference to the accompanying figures.

FIG. 4A, 4B, 4C are sectional views through airfoils of an aircraft with a buffeting load control element according to the invention in three different extension positions;

DETAILED DESCRIPTION OF THE PREFERRED EMBODIMENTS

Figure 1:
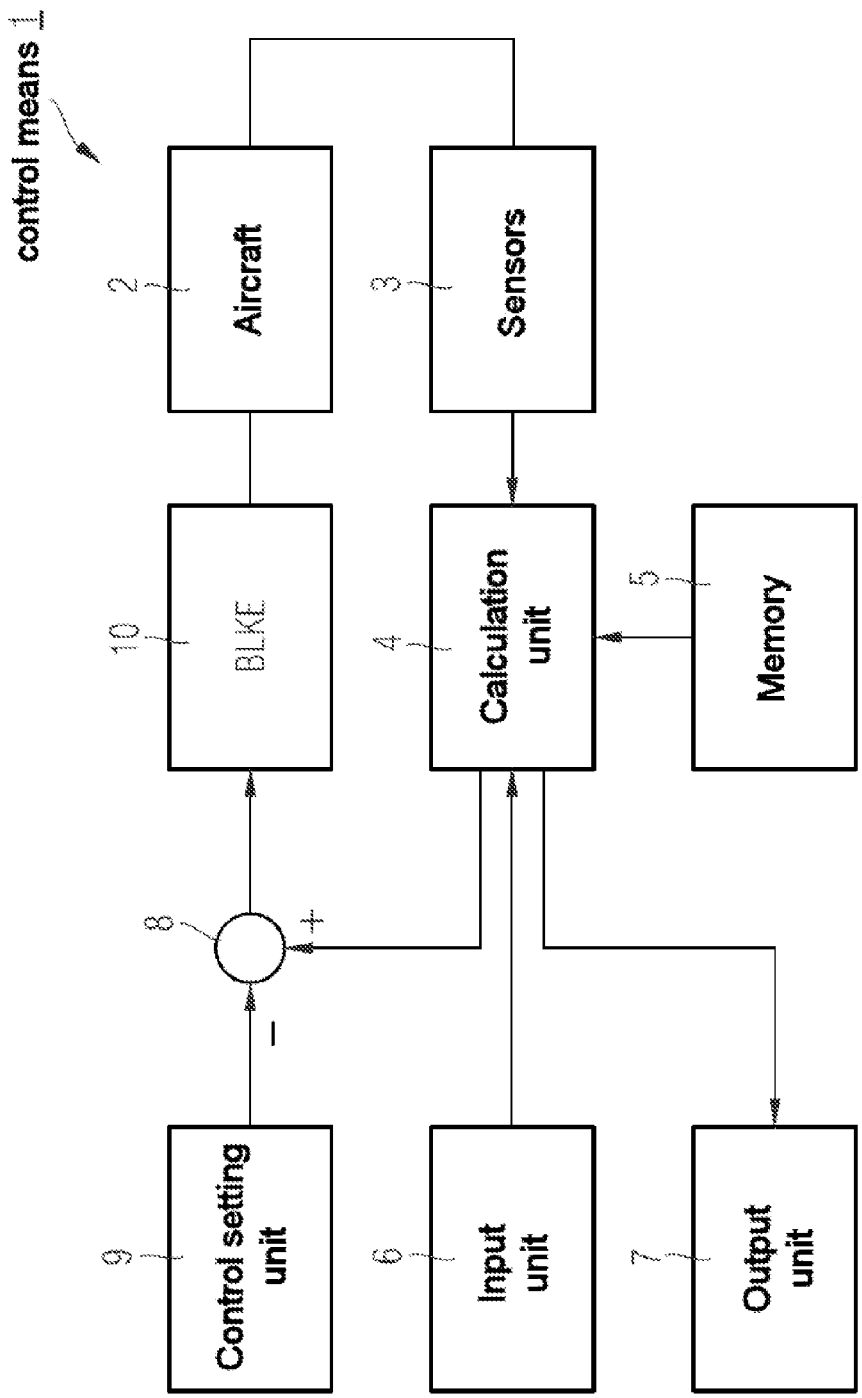
FIG. 1 is a block diagram of a possible embodiment of the control means according to the invention.

As can be seen in FIG. 1, a control means 1 which is used in the system according to the invention and is provided in an aircraft 2, for example a commercial aircraft, has sensors 3 which are present on the aircraft 2. The purpose of the sensors 3 is to detect aeroelastic and flight-mechanical momenta of the aircraft 2. Furthermore, the sensors 3 can be provided to detect positions and movements of control surfaces of the aircraft 2. The sensors 3 can also detect sensitivity to gusts of wind acting on the aircraft 2. In a possible embodiment, the sensors 3 can comprise control surface sensors, flight-mechanical sensors and aeroelastic sensors. The sensors 3 which are provided to detect flight-mechanical momenta and aeroelastic momenta of the aircraft 2 comprise, for example, acceleration and pressure sensors. Furthermore, the sensors 3 can comprise strain gauges provided in structural regions of the aircraft 2.

The sensors 3 can also detect different flight phases of the aircraft 2. A flight phase of the aircraft 2 can be established by flight parameter intervals. Examples of such flight parameters are flight speed, flight altitude, angle of attack or position of the high-lift system.

The control means 1 further comprises a calculation unit 4 which has access to a memory 5. Furthermore, the sensors 3 of the aircraft 2 supply the calculation unit 4 with sensor data via a transmission network of the aircraft. FIG. 1 also shows an input unit 6, for example for inputting parameters into the control means 1. Furthermore, the calculation unit 4 can send data to a user via an output unit 7. The output unit 7 is, for example, an indication means or a display. The input unit 6 can be, for example, a keyboard for inputting data. The input unit 6 and the output unit 7 together form a user interface. This user interface can be used by, for example, an engineer on board the aircraft 2.

The calculation unit 4 delivers an output signal to a differentiator 8 of the control means 1. This differentiator 8 forms a comparison unit which, in a possible embodiment, determines a difference between precalculated quantities and the output signal of the calculation unit 4. The precalculated quantities can be input via a control setting unit 9, for example. In the control means 1 according to the invention, buffeting load control elements 10 which form part of an on-board system of the aircraft are controlled as a function of the differential signal or the deviation signal. The control setting unit 9 can be located in the cockpit of the aircraft 2, for example. The calculation unit 4 is, for example, a microprocessor or a custom integrated circuit ASIC.

The buffeting load control elements 10 are preferably provided in airfoils of the aircraft 2. These buffeting load control elements 10 can be at least partly moved out of the airfoils of the aircraft 2 by the control means 1 to reduce buffeting loads acting on the aircraft 2. In a possible embodiment, one or more buffeting load control elements 10 is provided in each case for one structural region of the aircraft structure in which a load acting thereon is almost constant. A structural region of this type can also be called a load station. A load station is thus a region of the aircraft structure in which the load can be assumed as being almost constant.

Figure 2:
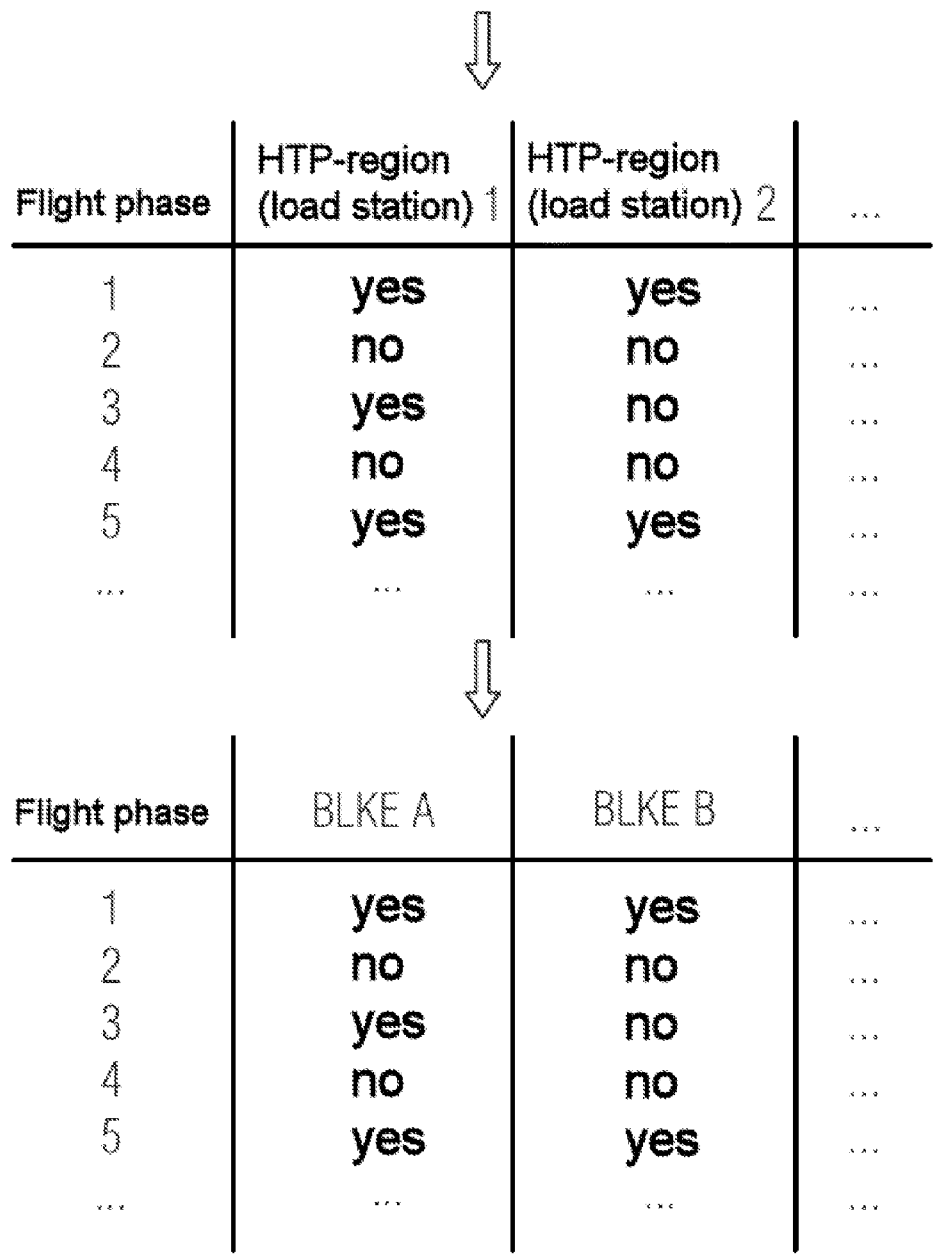
FIG. 2 shows a data structure for controlling buffeting load control elements, as can be used for the control means according to the invention.

The control means 1 has a memory 5 which stores information for different flight phases of the aircraft 2 for all buffeting load control elements 10 of the aircraft 2 concerning whether or not the respective buffeting load control element 10 is to be moved out of the aerofoil of the aircraft 2 during flight operation in the respective flight phase. FIG. 2 shows by way of example a data structure which is stored in the memory 5 of the control means 1 to control the buffeting load control elements 10. It is shown in the illustrated example for two different buffeting load control elements 10-A, 10-B for different flight phases of the aircraft 2 whether or not the respective buffeting load control element 10-A, 10-B is to be moved out of the aerofoil of the aircraft 2 in this flight phase. In a possible embodiment, placed in the data structure is a so-called flag which indicates whether or not the respective buffeting load control element 10 is to be activated for the respective flight phase. During normal flight operation of the aircraft 2, the data structure shown by way of example in FIG. 2 is stored for control in the memory 5 so that the calculation unit 4 has access to the data therein. The data structure itself can be determined using measurements during a flight testing phase of the aircraft 2. In normal flight operation, the calculation unit 4 can establish or detect the current flight phase of the aircraft 2 using the sensor data supplied by the sensors 3. The control data concerning the buffeting load control elements 10, which is stored for the respective flight phase, is activated accordingly by the control output signal of the calculation unit 4 by the calculation unit 4 from the memory 5.

In a possible embodiment, each buffeting load control element 10 can be actuated between a first retracted position P1, a second middle, partly extended position P2 and a third fully extended position P3. In this preferred embodiment, each buffeting load control element 10 is moved into the second middle, partly extended position P2 when the respective buffeting load control element 10 is to be moved out of the aerofoil in the current flight phase of the aircraft 2, as is stored in the memory 5 of the control means 1. Movement into the middle position P2, i.e. between the retracted position and the maximally extended position P3, takes place according to the control signal, unless a pilot makes a different or additional setting via the control setting unit 9 or unless the on-board system or the buffeting load control elements 10 are switched off via an operating selection control signal. In the system 1 according to the invention, the moving-out procedure of the buffeting load control elements 10 as a component part of the on-board system into the middle partly extended position P2 provides the possibility, due to the remaining extension reserve (into position P3) of performing an almost continuous optional adaptation of the positions of the buffeting load control elements 10 according to the loads and/or accelerations and/or other aeroelastic measurements respectively measured by sensors 3 at a high sampling rate. These aeroelastic measurements can be, for example, deformations in different areas of a tailplane of the aircraft 2 or aeroelastic measurements on wings of the aircraft 2. In a possible embodiment of the system according to the invention, provided on structural regions of the aircraft 2 are further load sensors which detect a current load or force acting on the respective structural region during flight operation of the aircraft 2. In this respect, the buffeting load control elements 10 provided for the structural region are moved adaptively, as a function of the detected load, between the second middle, partly extended position P2 and the third fully extended position P3 to minimize the load currently acting by buffeting on the respective structural region. In a possible embodiment of the system according to the invention, the control means 1 determines degrees of extension for the buffeting load control elements 10 in real time. According to the calculated degrees of extension, the buffeting load control elements 10 are moved out of the airfoils to minimize buffeting-induced turbulence. Due to the separations occurring on the wings, turbulence or stochastic airflows arise downstream of the wings. In turn, they result in vibrations for structural regions of the aircraft 2 located downstream. The loading caused by buffeting is a stochastic quantity. In the system according to the invention, buffeting is actively compensated by the buffeting load control elements 10. Consequently, the mechanical stresses of the aircraft body or of the aircraft fuselage structure are minimized. In turn, this makes it possible for the aircraft 2 to be manufactured in a lighter method of construction and to thus reduce weight and save fuel in flight operation.

In an embodiment of the system according to the invention, the calculation unit 4 of the control means 1 also calculates amplitudes for control surfaces of the aircraft 2. These control surfaces are provided on the airfoils of the aircraft 2. They are adjusted statically or dynamically according to the amplitudes calculated by the calculation unit 4 to minimize the buffeting-induced vibrations. In this embodiment, the calculation unit 4 controls additional control surfaces, apart from the buffeting load control elements 10 as shown in FIG. 1, to further minimize the buffeting effect. The control surfaces can be, for example, elevators on a tailplane of the aircraft 2.

In a possible embodiment of the system according to the invention, calculated during a flight testing phase of the aircraft 2 using a stochastic, non-linear dynamic model of the aircraft 2 and sensorially detected buffeting characteristic quantities for each flight phase and for each structural region of the aircraft 2 affected by buffeting is a probability that a predetermined maximum load will be reached during a total operation period of the aircraft 2 in the respective structural region of the aircraft 2. The maximum load or limit load is, for example, ⅔ of a maximally admissible load. In a possible embodiment of the system according to the invention, as a function of the calculated probabilities, a buffeting load control element 10 which reduces a buffeting load on a structural region of the aircraft 2, the calculated probability of which exceeds a predetermined probability threshold value, is stored or characterized as a buffeting load control element 10 in the memory 5 and is to be moved out of the aerofoil of the aircraft 2 during normal flight operation of the aircraft 2. In this respect, the respective buffeting load control element 10 is preferably brought initially into the middle partly extended position P2.

By means of a stochastic non-linear data model, the calculation unit 4 can calculate during the flight testing phase for each flight phase and for each load station the probability of maximum loads or limit loads arising in the respective structural region or load station. In a possible embodiment, during the stochastic simulation, white noise can be used for the buffeting load. In a possible embodiment, a pre-adaptation of the parameters of the stochastic non-linear data model can also be carried out using identification methods, for example by means of a least square method. If it is found during the flight testing phase of the aircraft 2, for example by means of the output unit 7 of the control means 1, that individual parameters of the data model used are not stored accurately enough in the memory 5, the sensor data measured by the sensors 3 is to be reproduced and these parameters can be adapted via the input unit 6, for example by an on-board engineer, until an adequate conformity with the measurements established during the flight testing phase is achieved. If a probability is greater than once over the total operation period of the aircraft, those buffeting load control elements 10 as a component of the on-board system are moved out which particularly significantly reduce the respective buffeting load concerned so that the maximum load or limit load is not reached. The different flight phases of the aircraft 2 can be established by flight parameter intervals. These interval limits can be determined using a stochastic data model. Two adjoining flight phases differ from one another in that at least at one load station of one flight phase, the probability is greater than once over the total operation period of the aircraft 2, while in the other flight phase, the probability is less than once over the total operation period of the aircraft. The table resulting thus is stored in the memory 5, as shown in FIG. 2. In normal flight operation of the aircraft, the current flight phase of the aircraft 2 is then established by the calculation unit 4 using the sensor data provided by the sensors 3, for example after a corresponding initiation via the input unit 6 of the control means 1 and the control data concerning the buffeting load control elements 10 which is stored in the memory 5 is read out for the respective flight phase. If the aircraft 2 is in an established flight phase in which the probability for a load station is greater than once over the total operation period of the aircraft, the appropriate buffeting load control elements 10 are moved into the middle partly extended position P2 according to the control table which has been read out, unless the pilot makes a different or additional setting via the control setting unit 9 or deactivates buffeting load control elements.

In an alternative embodiment, the stochastic data model in the calculation unit 4 is simulated in real time as soon as at least one of the flight parameters detected by the sensors 3 changes significantly. The moving-out of the buffeting load control elements 10 is initiated by the calculation unit 4 in real time as soon as the probability differs by more than a differential range to be set, for example 10%, from a probability value of "greater than once over the total operation period of the aircraft". An extension reserve remains as a result of the buffeting load control elements 10 moving out into the middle position P2. This allows an almost continuous optimum adaptation of the extension position P of the buffeting load control elements 10 according to the loads and/or accelerations and/or other aeroelastic measured variables respectively measured by sensors 3 at a high sampling rate. In a possible embodiment, the sampling rate is less than ¹⁄₁₀ msec. The adaptation of the positions P of the buffeting load control elements 10 can establish a control law which is also stored in the memory 5. This control law is evaluated in the calculation unit 4 according to the current output data or sensor data of the sensors 3 according to the sampling rate if a corresponding initiation has taken place via the input unit 6. As a result, the loads are automatically minimized. In a possible embodiment, a compromise can also be automatically adjusted between minimizing the loads to minimize the acceleration for an optimization of passenger comfort and to minimize the air drag which increases due to the moving out procedure of the buffeting load control elements 10.

Figure 3:
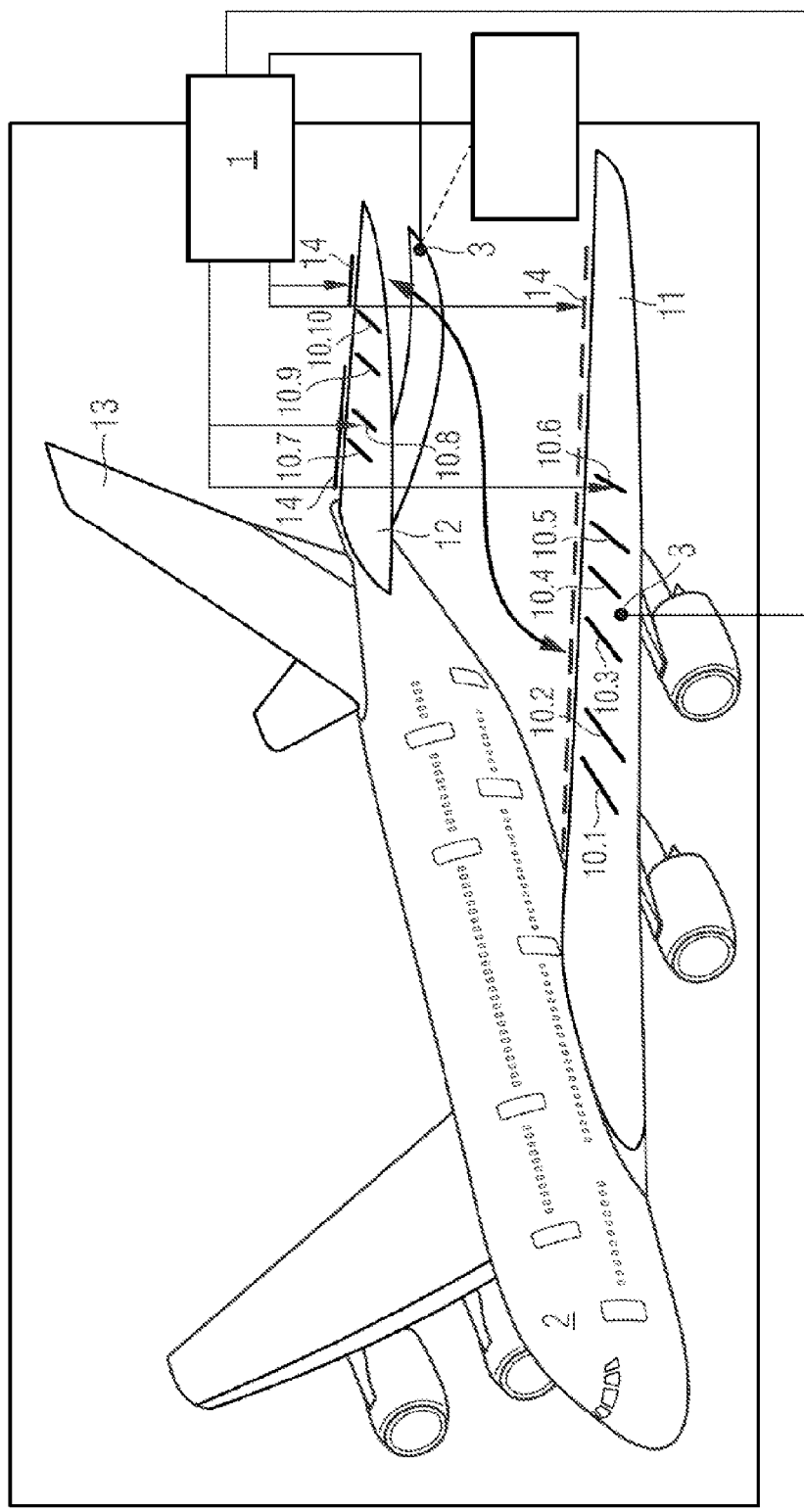
FIG. 3 shows an embodiment of a system according to the invention for minimizing aircraft buffeting.

FIG. 3 illustrates an embodiment of the system according to the invention for minimizing buffeting in an aircraft 2. The aircraft 2 in the illustrated example is a commercial aircraft, in particular a passenger aircraft. The aircraft 2 has airfoils 11 or wings 11 which give the aircraft aerodynamic lift. The aircraft 2 also has a tailplane 12 and a rudder unit 13. In the embodiment shown in FIG. 3, provided in airfoils of the aircraft 2 are buffeting load control elements 10-$i$ which can be at least partly extended by a control means 1. The control means 1 is located in the fuselage of the aircraft 2. In the illustrated embodiment, six buffeting load control elements 10-$i$ to 10-6 are provided in each wing 11 of the aircraft 2. Furthermore, in the illustrated embodiment, four buffeting load control elements 10-7 to 10-10 are also provided on the tailplane 12. Moving the buffeting load control elements 10 out of the airfoils 11 influences the airflow in order to minimize turbulence. In a preferred embodiment, the buffeting load control elements 10-$i$ are controlled separately by the control means 1. Various sensors 3 are fitted to the aircraft 2. In particular, as shown in FIG. 3, the aircraft 2 has sensors 3 which provide the control means 1 with aeroelastic measured data. Thus, these sensors 3 measure a structural load on structural regions of the aircraft 2. These load sensors can be, for example, acceleration sensors, but also strain gauges. Optical deformation sensors can also be used. In the illustrated embodiment, six buffeting load control elements 10-$i$ are provided on one wing 11 of the aircraft 2. In further embodiments, up to approximately 30 buffeting load control elements 10 can be provided in each wing 11. Furthermore, as shown in FIG. 3, the control means 1 can govern control surfaces or flaps 14 which are, for example elevators on the tailplane 12 of the aircraft 2. In this embodiment, the control means 1 also calculates amplitudes for the control surfaces 14 provided on the airfoils 11 of the aircraft 2. These control surfaces 14 are adjusted statically or dynamically according to the calculated control surface amplitudes to minimize buffeting-induced vibrations in addition to the buffeting load control elements 10.

FIG. 4A, 4B, 4C are sectional views through a wing 11 of the aircraft 2. FIG. 4A shows a buffeting load control element 10 in a retracted first position P1. The buffeting load control elements 10 can be at least partly moved out of the airfoils 11 of the aircraft 2 by hydraulic elements 15-1, 15-2. The hydraulic elements 15-1, 15-2 are actuated by the control means 1. FIG. 4B shows a buffeting load control element 10 in a second middle, partly extended position P2 after an appropriate actuation of the hydraulic elements 15-1, 15-2 by the control means 1. FIG. 4C shows the buffeting load control element 10 in a third fully extended position P3.

A buffeting load control element 10 which has been moved out influences the onwardly approaching flow and turbulence or air turbulence caused by the wings 11 is minimized to prevent buffeting.

As can be seen in FIGS. 4A, 4B and 4C, the buffeting load control elements 10 are fin-shaped webs which can be moved out of the airfoils 11 of the aircraft 2. These fin-shaped webs are in the form of a flat shark fin and, as shown in FIGS. 4A, 4B and 4C, are streamlined.

Figure 5:
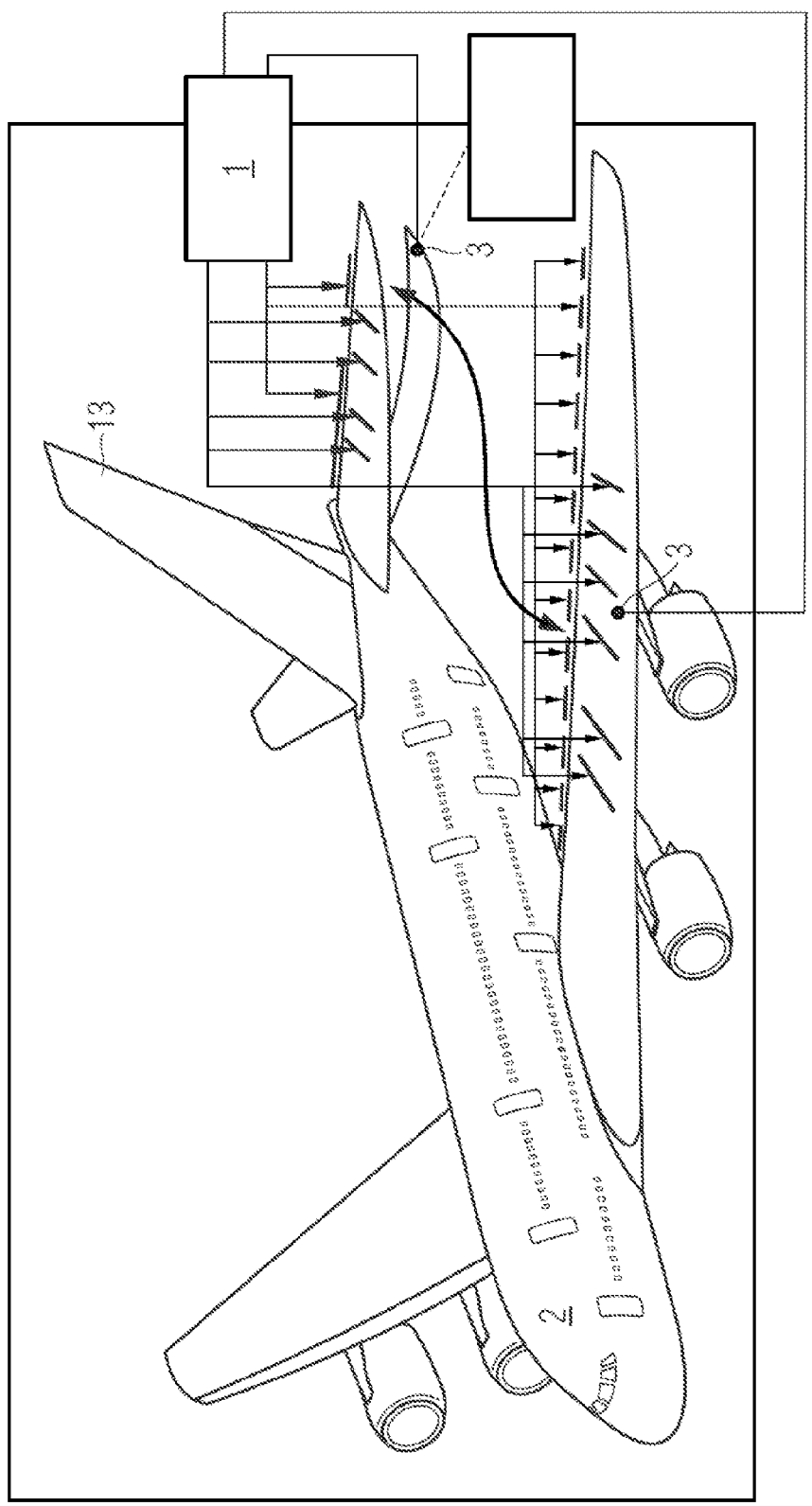
FIG. 5 shows a further embodiment of a system according to the invention for minimizing aircraft buffeting.

FIG. 5 shows a further embodiment of the system according to the invention for minimizing buffeting in the case of an aircraft 2. In the illustrated embodiment, a plurality of buffeting load control elements 10 and a plurality of control surfaces 14 are controlled in parallel by a common control signal.

Figure 6:
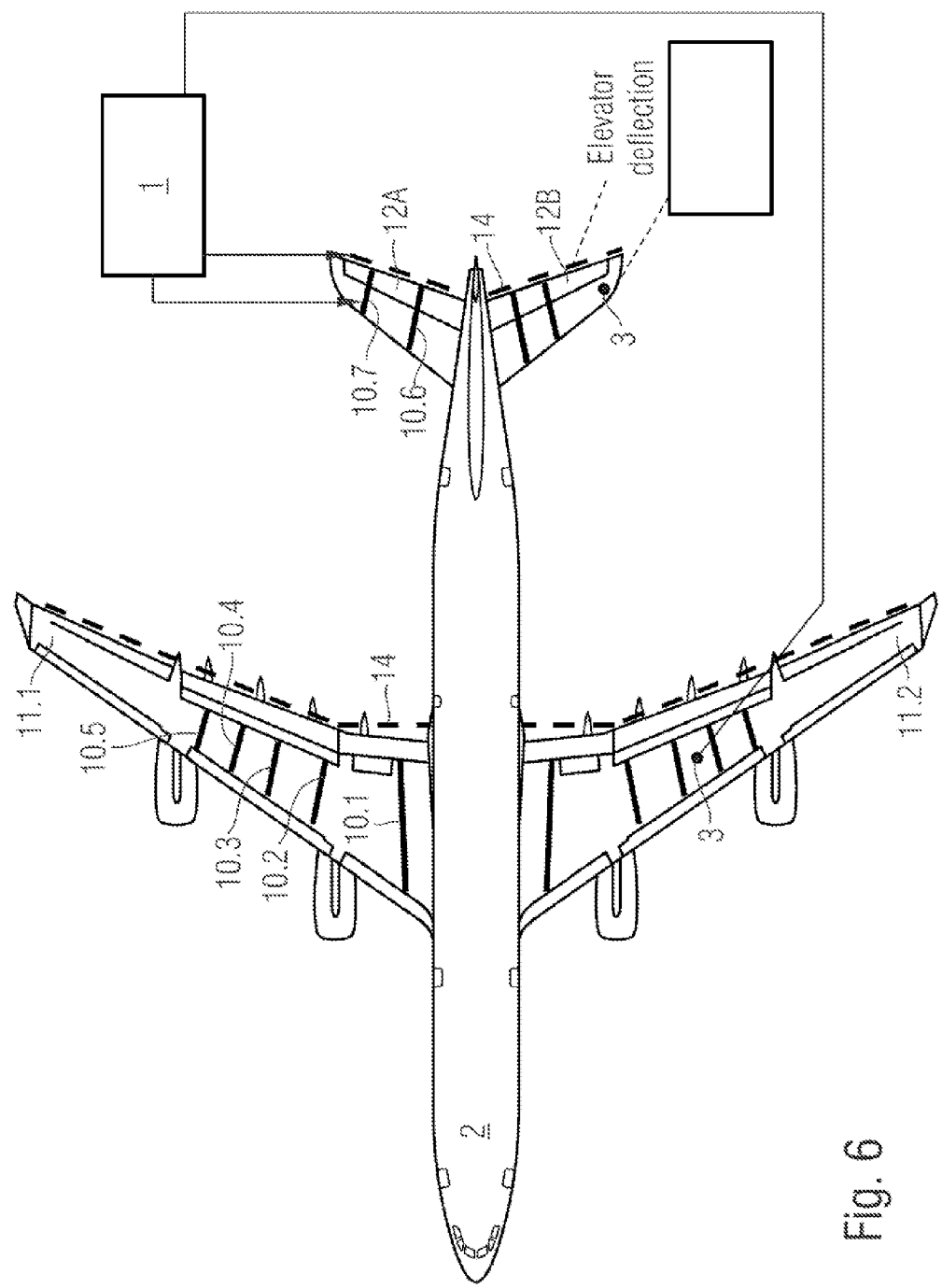
FIG. 6 is a view from above onto an aircraft to illustrate the system according to the invention for minimizing buffeting.

FIG. 6 is a view from above onto the aircraft 2. In the illustrated embodiment, the two wings 11A, 11B each have five buffeting load control elements 10-1 to 10-5. Furthermore, in each case two buffeting load control elements 10-6, 10-7 are also provided on the two tailplanes 12A, 12B. A possible site for sensors 3 providing aeroelastic measured data is also shown. The sensors 3 are located on the upper side of the wings 11 in a central position and on the tip of at least one of the tailplanes 12.

Figure 7:
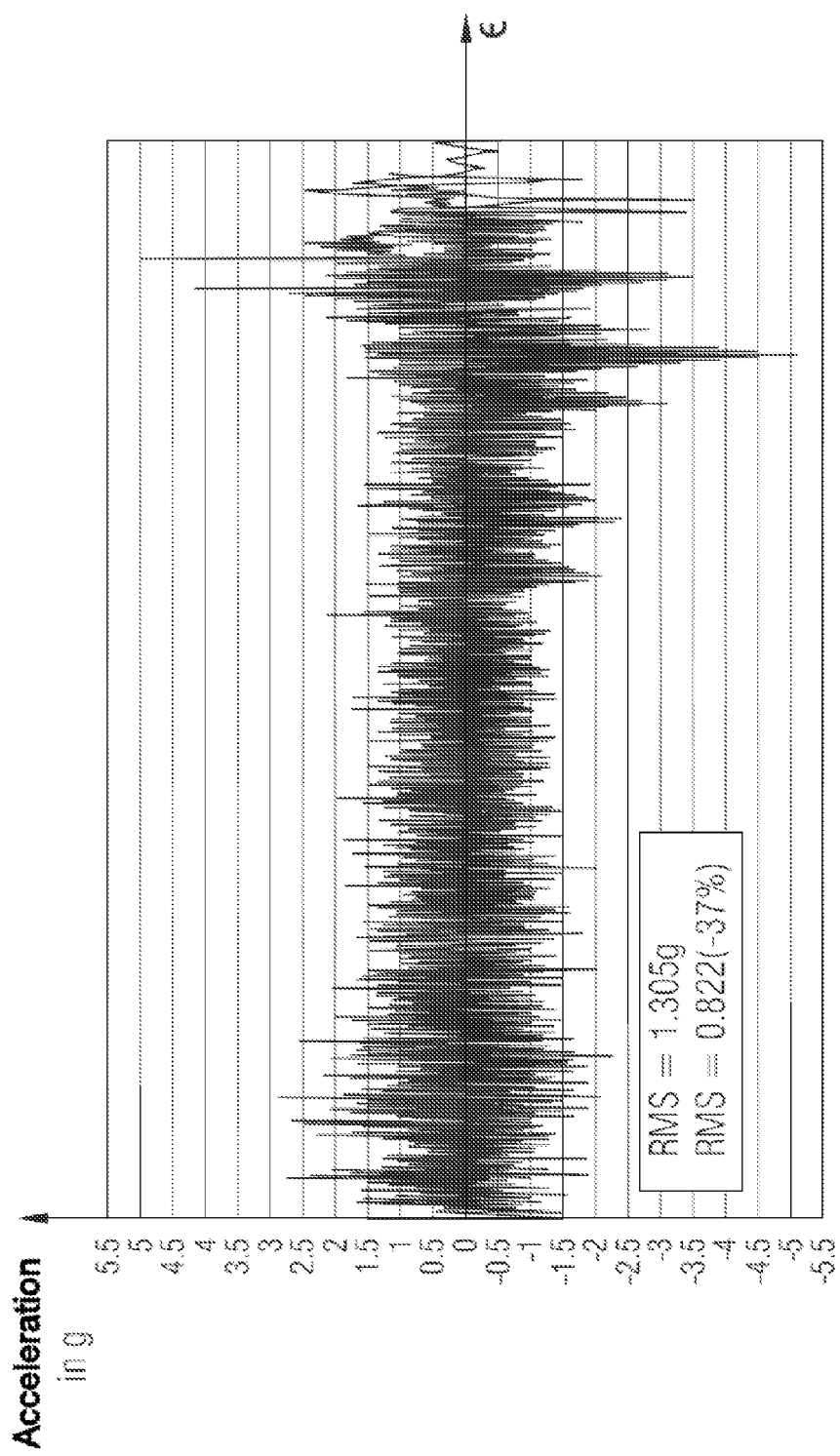
FIG. 7 is a signal diagram to explain the system according to the invention for minimizing aircraft buffeting.

FIG. 7 shows a signal diagram to explain the system according to the invention. In the illustrated signal diagram, an acceleration signal on the tip of the tailplane 12 is shown over the course of time. A load factor on the tailplane HTP in a stall test is shown under low speed conditions. By moving out the buffeting load control elements 10, it is possible to reduce the acceleration signal on average by approximately 37%. FIG. 7 shows that as a result of moving the buffeting load control elements 10 out of the airfoils 11 of the aircraft 2, in particular the load on the tailplane 12 can be significantly reduced because buffeting has been minimized.

During a flight testing phase of the aircraft 2 using a stochastic, non-linear dynamic data model of the aircraft 2 and the sensorially detected buffeting characteristic quantities for each flight phase and for each structural region of the aircraft 2 affected by buffeting, a probability can be calculated that a predetermined limit load will be reached during a total operation period of the aircraft 2 in the respective structural region of the aircraft 2.

Figure 8:
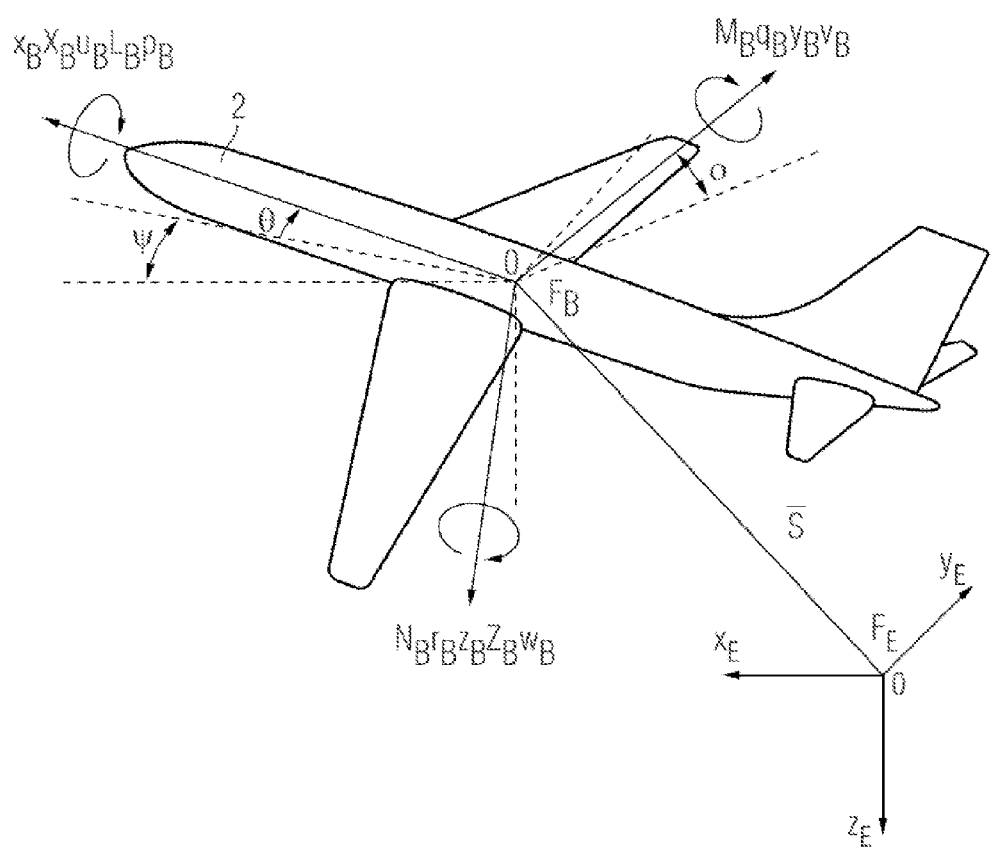
FIG. 8 shows a diagram to illustrate a coordinate system for a non-linear dynamic model of an aircraft which can be used in a flight testing phase to establish data.

FIG. 8 shows coordinate systems of a non-linear simulation model of the aircraft 2 which is used in establishing control data.

As can be seen from FIG. 8, the movements of an aircraft 2 can be described by characteristic quantities. The flight mechanics describe the behavior of the aircraft 2 which moves in the atmosphere by means of aerodynamics. The flight mechanics describe the behavior of the entire system or of the aircraft, with a position, altitude and speed of an aerodynamic vehicle 2 being calculated at a random point in time. This is carried out using motion equations which form a system of coupled differential equations. Maneuvering loads and structural loads arise on the aircraft 2 as a result of flight maneuvers and air turbulence. Maneuvering loads can be described by non-linear motion equations and are based on databases which specify aerodynamic forces. Particularly large aircraft 2 must also consider the elastic deformations of their structure in addition to non-linear movements.

The movement of a rigid aircraft 2 can be described by system variables. In each case, three of these variables are combined into a vector, describing the $$\text{Position: } \vec{S} = [x \ y \ z]^T \tag{1}$$

$$\text{Angular position (Euler angles): } \Phi = \begin{bmatrix} \phi \\ \theta \\ \psi \end{bmatrix} \tag{2}$$

Bank angle (roll angle)
Inclination angle (pitch angle)
Heading (yaw angle)

$$\text{Speed: } \vec{V} = [u \ v \ w]^T \tag{3}$$

$$\text{Angular velocity: } \vec{\Omega} = \begin{bmatrix} p \\ q \\ r \end{bmatrix} \tag{4}$$

Roll rate
Pitch rate
Yaw rate

The causes of the movement are the forces acting on the aircraft 2, $$\text{Weight } \vec{G} = [G_x G_y G_z]^T \tag{5}$$

thrust and aerodynamic forces as well as the moments thereof, the resultants of which are combined in the vectors:

$$\text{Force: } \vec{R} = [XYZ]^T \tag{6}$$

$$\text{Movement: } \vec{Q} = [LMN]^T \tag{7}$$

A further important quantity is the specific force measured by the accelerometers 3.

$$\vec{b} = [b_x b_y b_z]^T$$

The specific force is an indication of the acceleration impression of the pilot according to magnitude and direction and is defined as the ratio of the resulting external force to the mass of the aircraft.

To determine Newton's equations and the angular momentum equation, the accelerations and speeds are measured with respect to an inertial system. The earth is used as an inertial system, an earth frame of reference FE being defined in which the z-axis is directed towards the geocenter. The x- and y-axes are selected such that a right-handed system is produced. The axis system can be oriented, for example, towards the magnetic north. When evaluating the angular momentum equation, it has proved to be advantageous to do this in a body frame of reference $F_B$, because then the inertia sensor is constant. There are various approaches for establishing the axes of the body frame of reference, the origin in each case being in the centre of gravity C of the aircraft 2. The main axis system is disposed such that the x-axis is in the direction of the longitudinal axis of the aircraft 2 and the z-axis is directed vertically downwards relative thereto. Cy is selected such that a right-handed system is produced. If the stability axes are selected, the x-axis is disposed in the direction of the flight speed. The two other axes are established analogously to the main axes. FIG. 8 shows the basic quantities and the relative position of the flight frame and earth frame of references.

To describe the aerodynamic forces simply, an aerodynamic coordinate system $F_A$ is provided, the origin of which is also located in the centre of gravity C of the aircraft 2. The x-axis of this coordinate system lies in the direction of the negative oncoming flow speed and the z-axis is in the direction of the negative lift. The y-axis is selected analogously to the previous observations. This coordinate system is obtained by rotating the body frame main axis system by an angle of attack α about its y-axis and then by an angle of yaw β about the z-axis. The aerodynamic coordinate system $F_A$ is a body frame reference only in stationary flying states of the aircraft.

The transition from the body frame to the earth frame of reference is effected using a transformation matrix $L_{EB}$.

$$\underline{L}_{EB} = \begin{bmatrix} \cos\theta\cos\psi & \sin\phi\sin\theta\cos\psi - \cos\phi\sin\psi & \cos\phi\sin\theta\cos\psi + \sin\phi\cos\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{bmatrix} \quad (9)$$

The subscript index indicates the coordinate system in which the vectors are shown. For example, the vector $\vec{R}_E$ in the earth frame of reference $F_E$ is obtained from the vector $\vec{R}_B$ shown in body frame coordinates, where:

$$\vec{R}_E = \underline{L}_{EB}\vec{R}_B \quad (10)$$

To simplify the notation, the index B is omitted in the following if it is not absolutely necessary. When considering speed, a distinction must also be made between wind and calm. The following generally applies with the speed addition law:

$$\vec{V}_E^B = \vec{V}_E^B + \vec{W}_E \quad (11)$$

with the superscript index establishing the reference system in which the corresponding speeds are measured. $\vec{W}_E$ is the wind speed which can be assumed as zero. Thus, the amounts in both reference systems are the same and the superscript index can be omitted.

With the components of the vectors $$\vec{V}, \vec{\Omega} \text{ and } \vec{\varphi}$$

as state quantities, the motion equations are obtained in state space during a calm from Newton's equation and the angular momentum equation, as well as from the relationship between the Euler angles and the rates thereof. The equations apply in particular when the earth is considered as an inertial system with a homogeneous gravitational field and the airplane or aircraft 2 is symmetrical with respect to its x-z plane. The arising forces engage according to the model in the centre of gravity and the generation of aerodynamic forces is quasi-stationary.

Newton's equation for the centre of gravity of the aircraft in earth frame coordinates is:

$$\vec{F}_E = m\dot{\vec{V}}_E \quad (12)$$

Using the transformation matrix $\underline{L}_{EB}$, this is transformed into the body frame of reference.

$$\underline{L}_{EB}\vec{F} = m\frac{d}{dt}(\underline{L}_{EB}\vec{V}) \quad (13)$$

$$= m(\underline{\dot{L}}_{EB}\vec{V} + \underline{L}_{EB}\dot{\vec{V}})$$

The following applies:

$$\underline{\dot{L}}_{EB}\vec{V} = \underline{L}_{EB}(\vec{\Omega} \times \vec{V}) \quad (14)$$

from which follows:

$$\underline{L}_{EB}\vec{F} = \underline{L}_{EB}m(\vec{\Omega} \times \vec{V} + \dot{\vec{V}}) \quad (15)$$

The resulting force $\vec{F}$ is composed of the aerodynamic force $\vec{R}$ and the weight force $\vec{G} = \underline{L}_{EB}^{-1}\vec{G}_E$. These relationships are inserted into the above equation and then resolved according to $\dot{\vec{V}}$.

$$\dot{\vec{V}} = \frac{1}{m}(\vec{R} + L_{EB}^{-1}\vec{G}_E) - \vec{\Omega} \times \vec{V} \quad (16)$$

Thus, the equations for the speeds are established. The relationships for the rates are obtained analogously from the angular momentum equation with the angular momentum $\vec{H}$ and the inertia sensor $\underline{I}$:

$$\vec{Q}_E = \dot{\vec{H}}_E \quad (17)$$

$$\underline{L}_{EB}\vec{Q} = \frac{d}{dt}(\underline{L}_{EB}\vec{H}_E)$$

$$= \underline{\dot{L}}_{EB}\vec{H} + \underline{L}_{EB}\dot{\vec{H}}$$

$$= \underline{L}_{EB}(\vec{\Omega} \times I\vec{\Omega} + I\dot{\vec{\Omega}})$$

$$\dot{\vec{\Omega}} = I^{-1}\vec{Q} - I^{-1}\vec{\Omega} \times I\vec{\Omega}$$

These relationships, divided up into components, produce together with the equations between Euler angles and the rates thereof, the state equations of a rigid aircraft 2

$$\dot{u} = \frac{1}{m}X - g\sin\theta - qw + rv \quad (18)$$

$$\dot{v} = \frac{1}{m}Y + g\cos\theta\sin\phi - ru + pw$$

$$\dot{w} = \frac{1}{m}Z + g\cos\theta\cos\phi - pv + qu$$

-continued $$\dot{p} = \frac{1}{I_z I_x - I_{zx}^2} \begin{bmatrix} qr(I_y I_z - I_z^2 - I_{zx}^2) + \\ qpI_{zx}(I_z + I_x - I_y) + LI_z + NI_{zx} \end{bmatrix}$$

$$\dot{q} = \frac{1}{I_y}[rp(I_z - I_x) + I_{zx}(r^2 - p^2) + M]$$

$$\dot{r} = \frac{1}{I_z I_x - I_{zx}^2} \begin{bmatrix} qrI_{zx}(I_y - I_z - I_x) + \\ qp(I_{zx}^2 + I_x^2 - I_x I_y) + LI_{zx} + NI_x \end{bmatrix}$$

$$\dot{\phi} = p + (q\sin\phi + r\cos\phi)\tan\theta$$

$$\dot{\theta} = q\cos\phi - r\sin\phi$$

$$\dot{\psi} = \frac{1}{\cos\theta}(q\sin\phi + r\cos\phi)$$

By transforming the speed $\vec{V}$ into the earth frame of reference, where $$\vec{V}_E = \underline{L}_{EB} \vec{V} \quad (19)$$

the differential equations are obtained for calculating the position:

$$\dot{x}_E = u\cos\theta\cos\psi + v(\sin\varphi\sin\theta\cos\psi - \cos\varphi\sin\psi) + w(\cos\varphi\sin\theta\cos\psi + \sin\varphi\sin\psi)$$

$$\dot{y}_E = u\cos\theta\sin\psi + v(\sin\varphi\sin\theta\sin\psi + \cos\varphi\cos\psi) + w(\cos\varphi\sin\theta\sin\psi - \sin\varphi\cos\psi)$$

$$\dot{z}_E = -u\sin\theta + v\sin\varphi\cos\theta + w\cos\varphi\cos\theta \quad (20)$$

For the specific force, the following is obtained in body frame coordinates for a sensor located on the x-axis at a spacing $x_p$ from the centre of gravity:

$$\begin{bmatrix} b_x \\ b_y \\ b_z \end{bmatrix} = \begin{bmatrix} \dot{u} \\ \dot{v} \\ \dot{w} \end{bmatrix} - g \begin{bmatrix} -\sin\theta \\ \sin\phi\cos\theta \\ \cos\phi\cos\theta \end{bmatrix} + x_p \begin{bmatrix} -(q^2 + r^2) \\ \dot{r} \\ -\dot{q} \end{bmatrix} \quad (21)$$

If the vector entries are divided by the gravitational acceleration $$g = 9.81 \frac{m}{s},$$

the specific load factor is produced:

$$n_x = b_x/g, n_y = b_y/g, n_z = b_z/g$$

The above motion equations apply to an ideally rigid aircraft 2. However, in practice elastic deformations of the structure of the aircraft 2 occur which have a significant influence on the dynamic characteristics of the system. Therefore, the model is expanded by these elastic degrees of freedom. Quasi-static deformations are provided when the natural frequencies of the elastic modes are substantially higher than those of the rigid body modes. In this case, the influence of the elastic deformation can be considered by a corresponding adaption of the aerodynamic derivatives. If the natural frequencies of the elastic degrees of freedom are within the same range, the movement of the rigid body is influenced by the elastic deformations. In this case, the dynamics of the elastic degrees of freedom is to be considered in the motion equations. For this purpose, the deformation of the structure can be approximately described by the superposition of normal modes of the free vibration:

$$x'(t) = \sum_{n=1}^{\infty} f_n(x_0, y_0, z_0)\varepsilon_n(t) \quad (22)$$

$$y'(t) = \sum_{n=1}^{\infty} g_n(x_0, y_0, z_0)\varepsilon_n(t)$$

$$z'(t) = \sum_{n=1}^{\infty} h_n(x_0, y_0, z_0)\varepsilon_n(t)$$

x', y', z' are the deflections of the respective rest positions, $x_0, y_0, z_0$; $f_n, g_n$ and $h_n$ are the mode form functions and $\varepsilon_n$ are generalized coordinates. The additional motion equations for mode $\varepsilon_n$ are obtained from Lagrange's equation as equations of forced vibrations. For the mode $\varepsilon_n$, the following approximately applies with the natural frequency $\omega_n$ of the damping $d_n$ and the generalized moment of inertia $I_n$ $$\ddot{\varepsilon}_n + 2d_n\omega_n\dot{\varepsilon}_n + \omega_n^2\varepsilon_n = \frac{F_n}{I_n} \quad (23)$$

The approximation consists in disregarding all couplings over the damping terms between the individual modes. On the assumption that the influence of the degrees of freedom of the rigid body on the elastic modes can be described by a linear correlation and that the elastic deformations are adequately small, the generalized force $F_n$ is presented as a linear combination of state and input quantities:

$$F_n = a_{nu}\Delta u + a_{n\dot{u}}\dot{u} + \ldots + a_{np}p + \ldots + \quad (24)$$

$$a_{n\delta_r}\delta_r + \ldots + \sum_{j=1}^{\infty} a_{nj}\varepsilon_j + \sum_{j=1}^{\infty} b_{nj}\dot{\varepsilon}_j + \sum_{j=1}^{\infty} c_{nj}\ddot{\varepsilon}_j$$

The infinite series occurring here can be replaced by finite series which only retain those modes which lie in the range of the rigid body frequencies. It can be assumed for the further calculation that these are K modes which are combined in a vector $\underline{\varepsilon}$. Therefore, equation (24) can be written in the following form:

$$F_n = a_{nu}\Delta u + a_{n\dot{u}}\dot{u} + \ldots + a_{np}p + \ldots + a_{n\delta_r}\delta_r + \ldots + \quad (25)$$

$$\sum_{j=1}^{k} a_{nj}\varepsilon_j + \sum_{j=1}^{k} b_{nj}\dot{\varepsilon}_j + \sum_{j=1}^{k} c_{nj}\ddot{\varepsilon}_j$$

$$= a_{nu}\Delta u + a_{n\dot{u}}\dot{u} + \ldots + a_{np}p + \ldots + a_{n\delta_r}\delta_r + \ldots +$$

$$\underline{a}_{n\varepsilon}^T\underline{\varepsilon} + \underline{b}_{n\dot{\varepsilon}}^T\underline{\dot{\varepsilon}} + \underline{c}_{n\ddot{\varepsilon}}^T\underline{\ddot{\varepsilon}}$$

To arrive at a compact notation for all modes, the generalized moments of inertia $I_n$ are combined into the diagonal matrix $\underline{I}$, the scalar couplings are each combined into vectors and the vectorial coupling terms are combined into matrices. Thus, equation (24) can be formulated for all modes.

$$\ddot{\underline{\epsilon}}+2\underline{d\omega}^T\dot{\underline{\epsilon}}+\underline{\omega\omega}^T\underline{\epsilon}=\underline{I}^{-1}(\underline{a}_v\Delta u+\underline{a}_{\dot{u}}\dot{u}+\ldots+\underline{a}_p p+\ldots+\underline{a}_{\delta_r}\delta_r+\ldots+\underline{A}_\epsilon\underline{\epsilon}+\underline{B}_{\dot{\epsilon}}\dot{\underline{\epsilon}}+\underline{C}_{\dot{\epsilon}}\dot{\underline{\epsilon}})$$ (26)

Presentation in the state space is achieved by introducing the mode speed $\underline{\dot{\epsilon}}=\underline{v}$. This is used in equation (26):

$$\underline{\dot{v}}+2\underline{d\omega}^T\underline{v}+\underline{\omega\omega}^T\underline{\epsilon}=\underline{I}^{-1}(\underline{a}_v\Delta u+\underline{a}_{\dot{u}}\dot{u}+\ldots+\underline{a}_p p+\ldots+\underline{a}_{\delta_r}\delta_r+\ldots+\underline{A}_\epsilon\underline{\epsilon}+\underline{B}_v\underline{v}+\underline{C}_{\dot{v}}\dot{\underline{v}})$$ (27)

Using the matrices $$\underline{A}_{x3}=[\underline{a}_{\dot{u}},\underline{a}_{\dot{v}},\underline{a}_{\dot{w}},\underline{a}_{\dot{p}},\underline{a}_{\dot{q}},\underline{a}_{\dot{r}}],$$

$$\underline{A}_{x3}=[\underline{a}_u,\underline{a}_v,\underline{a}_w,\underline{a}_p,\underline{a}_q,\underline{a}_r],$$

$$\underline{A}_C=[\underline{a}_{\delta_E},\underline{a}_{\delta_A},\underline{a}_{\delta_R},\underline{a}_{\delta_C},\underline{a}_{\delta_F}],$$ (28)

and the unit matrix of k order $\underline{I}_k$, the state equation can be formulated:

$$\underline{\dot{\epsilon}}=\underline{v}\underline{\dot{v}}=\underline{I}_k-\underline{I}^{-1}\underline{C}_9)^{-1}[(\underline{I}^{-1}\underline{B}_v-2\underline{d\omega}^T)\underline{v}+(\underline{I}^{-1}\underline{A}_\epsilon-\underline{\omega\omega}^T)\underline{\epsilon}+\underline{A}_{x1}\underline{\dot{x}}_1+\underline{A}_{x1}\underline{x}_1+\underline{A}_c\underline{c}]^e$$ (29)

The external forces acting on an aircraft 2 are, in addition to the weight, the aerodynamic forces of lift and drag as well as thrust. The point of application of the lift is in the so-called neutral point which is different from the centre of gravity. As a result, moments are generated. This applies similarly to thrust. The resulting forces are combined in a vector $\vec{R}$ and the moments are combined in a vector $\vec{Q}$. Lift and drag are generated by the relative movement of aircraft and air, i.e. by $\vec{V}$ and $\vec{\Omega}$. Furthermore, these forces depend on the angle of attack a and the angles of the control surfaces of the primary flight control, elevator ($\delta_E$), aileron ($\delta_A$) and rudder ($\delta_R$). Depending on the type of aircraft, further control surfaces, spoilers, canards are used which are denoted in the following by $\delta_c$. The angles of the control surfaces are combined together with the thrust $\delta_F$ in a control vector $\underline{c}$. The aerodynamic effects are based on non-linear correlations. They can be described by Taylor's series which are interrupted according to a specific order. The coefficients of members of the second and third order are below the first order coefficients by one to two orders of magnitude. If the angle of attack remains below 10°, the terms of a higher order can be disregarded. The starting point for the linear approach is a stationary flight state of the aircraft 2. The speeds and rates as well as forces and moments are split up into a stationary and a disturbance term:

$$u=u_0+\Delta u \quad X=X_0+\Delta X \quad p=p_0+\Delta p \quad L=L_0+\Delta L$$

$$v=v_0+\Delta v \quad Y=Y_0+\Delta Y \quad q=q_0+\Delta q \quad M=M_0+\Delta M$$

$$w=w_0+\Delta w \quad Z=Z_0+\Delta Z \quad r=r_0+\Delta r \quad N=N_0+\Delta N$$ (30)

The horizontal symmetrical straight flight can be selected as the stationary flight state. If the stability axes are additionally selected as a flight frame of reference, the above relationships are simplified in that in this state, $X_0=Y_0=L_0=M_0=N_0=0$ and $\omega_0=v_0=p_0=q_0=r_0=0$. Since in horizontal flight, the z-axes of the flight frame and earth frames of reference are parallel, then $Z_0=-mg$. Furthermore, it approximately applies that $\omega \approx u_0 \alpha$.

$$\begin{bmatrix} X \\ Z \\ M \\ Y \\ L \\ N \end{bmatrix} = \begin{bmatrix} 0 \\ -mg \\ 0 \\ 0 \\ 0 \\ 0 \end{bmatrix} + \begin{bmatrix} X_u & X_w & X_{\dot{w}} & X_q & 0 & 0 & 0 & 0 & \underline{X}_\epsilon & \underline{X}_v & \underline{X}_c \\ Z_u & Z_w & Z_{\dot{w}} & Z_q & 0 & 0 & 0 & 0 & \underline{Z}_\epsilon & \underline{Z}_v & \underline{Z}_c \\ M_u & M_w & M_{\dot{w}} & M_q & 0 & 0 & 0 & 0 & \underline{M}_\epsilon & \underline{M}_v & \underline{M}_c \\ 0 & 0 & 0 & 0 & Y_v & Y_{\dot{v}} & Y_p & Y_r & \underline{Y}_\epsilon & \underline{Y}_v & \underline{Y}_c \\ 0 & 0 & 0 & 0 & L_v & L_{\dot{v}} & L_p & L_r & \underline{L}_\epsilon & \underline{L}_v & \underline{L}_c \\ 0 & 0 & 0 & 0 & N_v & N_{\dot{v}} & N_p & N_r & \underline{N}_\epsilon & \underline{N}_v & \underline{N}_c \end{bmatrix} \begin{bmatrix} \Delta u \\ w \\ \dot{w} \\ q \\ v \\ \dot{v} \\ p \\ r \\ \underline{\epsilon} \\ \underline{v} \\ \underline{c} \end{bmatrix}$$ (31)

The quantities which occur in equation (31) and are indexed with u and ε describe the influence of the elastic modes on the aerodynamics. They are in each case vectors of length k, with k being the number of elastic modes. The derivatives indexed with c are also vectors which describe the influence of the control factors. The dimension thereof is equal to the number of control factors.

The equations derived above are combined into a model by which the entire dynamics of the flexible aircraft can be described under the conditions mentioned in the preceding paragraphs. The states for describing the movement of the rigid body are combined in the vector $$\underline{x}_1 = [\Delta u w q \Theta \upsilon p r \varphi \psi]^T \quad (32)$$

$\underline{\varepsilon}$ and $\underline{\upsilon}$ denote the introduced elastic modes, while the control factors are contained in the vector $\underline{c}$. As for the introduction of the aerodynamic forces, this case also starts from the symmetrical horizontal straight flight. All the disturbance terms are assumed to be small enough for the linear approximation to be valid for the aerodynamics. Furthermore, $\underline{A}_{x1}$ is disregarded. Under these conditions, the motion equations can be written in the following form:

$$\begin{bmatrix} \underline{\dot{x}}_1 \\ \underline{\dot{\varepsilon}} \\ \underline{\dot{\upsilon}} \end{bmatrix} = \begin{bmatrix} A_{11} & A_{12} & A_{13} \\ 0 & 0 & I_k \\ A_{31} & A_{32} & A_{33} \end{bmatrix} \begin{bmatrix} \underline{x}_1 \\ \underline{\varepsilon} \\ \underline{\upsilon} \end{bmatrix} + \begin{bmatrix} B_1 \\ 0 \\ B_3 \end{bmatrix} \underline{c} + \begin{bmatrix} F \\ 0 \\ 0 \end{bmatrix} g(\underline{x}_1) \quad (33)$$

$$\underline{b} = [C_1 \ C_2 \ C_3] \begin{bmatrix} \underline{x}_1 \\ \underline{\varepsilon} \\ \underline{\upsilon} \end{bmatrix} + \underline{H}h(\underline{x}_1) + \underline{D}\underline{c} \quad (34)$$

The partial matrices used in equations (33) and (34) are compiled with the following abbreviations:

$$\begin{aligned}
\Delta &= I_z I_x - I_{zx}^2 \\
I_{qr1} &= I_y I_z - I_z^2 - I_{zx}^2 \\
I_{pq1} &= I_{zx}(I_z + I_x - I_y) \\
I_{qr2} &= I_{zx}(I_y - I_z - I_x) \\
I_{pq2} &= I_{zx}^2 + I_x^2 - I_x I_y \\
m_{\dot{w}} &= m - Z_{\dot{w}} \\
m_{\dot{\upsilon}} &= m - Y_{\dot{\upsilon}} \\
L'_i &= I_z L_i + I_{zx} N_i \\
N'_i &= I_{zx} L_i + I_x N_i
\end{aligned} \quad (35)$$

$$\underline{A}_{11} = \begin{bmatrix} A_{long} & 0 \\ 0 & A_{lat} \end{bmatrix} \quad (36)$$

$$A_{long} = \begin{bmatrix} \dfrac{X_u}{m} + \dfrac{Z_u X_{\dot{w}}}{m_{\dot{w}} m} & \dfrac{X_w}{m} + \dfrac{Z_w X_{\dot{w}}}{m_{\dot{w}} m} & \dfrac{X_q}{m} + \dfrac{X_{\dot{w}}(Z_q + m u_0)}{m_{\dot{w}} m} & 0 \\ \dfrac{Z_u}{m_{\dot{w}}} & \dfrac{Z_w}{m_{\dot{w}}} & \dfrac{Z_q + m u_0}{m_{\dot{w}}} & 0 \\ \dfrac{1}{I_y}\left(M_u + \dfrac{M_{\dot{w}} Z_u}{m_{\dot{w}}}\right) & \dfrac{1}{I_y}\left(M_w + \dfrac{M_{\dot{w}} Z_w}{m_{\dot{w}}}\right) & \dfrac{1}{I_y}\left(M_q + \dfrac{M_{\dot{w}}(Z_q + m u_0)}{m_{\dot{w}}}\right) & 0 \\ 0 & 0 & 0 & 0 \end{bmatrix} \quad (37)$$

$$A_{lat} = \begin{bmatrix} \dfrac{Y_{\upsilon}}{m_{\dot{\upsilon}}} & \dfrac{Y_p}{m_{\dot{\upsilon}}} & \dfrac{Y_r - m u_0}{m_{\dot{\upsilon}}} & 0 & 0 \\ \dfrac{L'_{\upsilon}}{\Delta} + Y_{\upsilon}\dfrac{L'_{\dot{\upsilon}}}{\Delta m_{\dot{\upsilon}}} & \dfrac{L'_p}{\Delta} + Y_p\dfrac{L'_{\dot{\upsilon}}}{\Delta m_{\dot{\upsilon}}} & \dfrac{L'_r}{\Delta} + \dfrac{L'_{\dot{\upsilon}}(Y_r - m u_0)}{\Delta m_{\dot{\upsilon}}} & 0 & 0 \\ \dfrac{N'_{\upsilon}}{\Delta} + Y_{\upsilon}\dfrac{N'_{\dot{\upsilon}}}{\Delta m_{\dot{\upsilon}}} & \dfrac{N'_p}{\Delta} + Y_p\dfrac{N'_{\dot{\upsilon}}}{\Delta m_{\dot{\upsilon}}} & \dfrac{N'_r}{\Delta} + \dfrac{N'_{\dot{\upsilon}}(Y_r - m u_0)}{\Delta m_{\dot{\upsilon}}} & 0 & 0 \\ 0 & 1 & 0 & 0 & 0 \\ 0 & 0 & 0 & 0 & 0 \end{bmatrix} \quad (38)$$

$$\underline{A}_{12} = [\underline{A}_{12long} \ \underline{A}_{12lat}]^T \quad (39)$$

where $$\underline{A}_{12long} = \left[ \dfrac{X_{\varepsilon}^T}{m} + \dfrac{Z_{\varepsilon} X_{\dot{w}}}{m_{\dot{w}} m} \quad \dfrac{Z_{\varepsilon}^T}{m_{\dot{w}}} \quad \dfrac{1}{I_y}\left(M_{\varepsilon} + \dfrac{M_{\dot{w}} Z_{\varepsilon}}{m_{\dot{w}}}\right)^T \quad \underline{0}^T \right] \quad (40)$$

$$\underline{A}_{12lat} = \left[ \dfrac{Y_{\varepsilon}^T}{m_{\dot{\upsilon}}} \quad \dfrac{1}{\Delta}\left(L'_{\varepsilon} + Y_{\varepsilon}\dfrac{L'_{\dot{\upsilon}}}{\Delta m_{\dot{\upsilon}}}\right)^T \quad \dfrac{1}{\Delta}\left(N'_{\varepsilon} + Y_{\varepsilon}\dfrac{N'_{\dot{\upsilon}}}{\Delta m_{\dot{\upsilon}}}\right)^T \quad \underline{0}^T \quad \underline{0}^T \right]$$

The matrices $\underline{A}_{13}$ and $\underline{B}_1$ are obtained by respectively replacing the index $\epsilon$ in the matrix $A_{12}$ by $\nu$ and c. The following applies to the remaining matrices:

$$\underline{A}_{31} = (\underline{I}_k - \underline{I}^{-1} \underline{C}_{\dot{\nu}})^{-1} \underline{A}_{x_1}, \tag{41}$$

$$\underline{A}_{32} = (\underline{I}_k - \underline{I}^{-1} \underline{C}_{\dot{\nu}})^{-1} (\underline{I}^{-1} \underline{A}_\varepsilon - \underline{\omega}\omega^T),$$

$$\underline{A}_{33} = (\underline{I}_k - \underline{I}^{-1} \underline{C}_{\dot{\nu}})^{-1} (\underline{I}^{-1} \underline{B}_\nu - 2\underline{d}\omega^T),$$

$$\underline{B}_3 = (\underline{I}_k - \underline{I}^{-1} \underline{C}_{\dot{\nu}})^{-1} \underline{A}_c,$$

$$\underline{F} = \begin{bmatrix} -g & \frac{gX_{\dot{w}}}{m_{\dot{w}}} & 0 & 0 & 0 & 0 & 1 & \frac{X_{\dot{w}}}{m_{\dot{w}}} & 0 & 0 & 0 & 0 \\ 0 & \frac{mg}{m_{\dot{w}}} & 0 & 0 & 0 & 0 & 0 & \frac{m}{m_{\dot{w}}} & 0 & 0 & 0 & 0 \\ 0 & \frac{M_w mg}{I_y m_{\dot{w}}} & 0 & 0 & 0 & 0 & 0 & \frac{M_w m}{I_y m_{\dot{w}}} & 0 & 0 & \frac{I_z - I_x}{I_y} & \frac{I_{zx}}{I_y} \\ 0 & 0 & 1 & 0 & 0 & 0 & 0 & 0 & 0 & 0 & 0 & 0 \\ 0 & 0 & 0 & \frac{mg}{m_{\dot{\upsilon}}} & 0 & 0 & 0 & 0 & \frac{m}{m_{\dot{\upsilon}}} & 0 & 0 & 0 \\ 0 & 0 & 0 & \frac{mgL'_\upsilon}{\Delta m_{\dot{\upsilon}}} & 0 & 0 & 0 & 0 & \frac{mL'_\upsilon}{\Delta m_{\dot{\upsilon}}} & \frac{I_{qr1}}{\Delta} & \frac{I_{pq1}}{\Delta} & 0 & 0 \\ 0 & 0 & 0 & \frac{mgN'_\upsilon}{\Delta m_{\dot{\upsilon}}} & 0 & 0 & 0 & 0 & \frac{mN'_\upsilon}{\Delta m_{\dot{\upsilon}}} & \frac{I_{qr2}}{\Delta} & \frac{I_{pq2}}{\Delta} & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \end{bmatrix} \tag{42}$$

$$\underline{g}(\underline{x}_1) = \begin{bmatrix} \sin\theta \\ \cos\theta\cos\phi - 1 \\ q\cos\phi - r\sin\phi \\ \cos\theta\sin\phi \\ (q\sin\phi + r\cos\phi)\tan\theta \\ \frac{1}{\cos\theta}(q\sin\phi + r\cos\phi) \\ -qw + r\upsilon \\ -p\upsilon + q\Delta u \\ -r\Delta u + pw \\ qr \\ pq \\ rp \\ r^2 - p^2 \end{bmatrix} \tag{43}$$

$$\underline{C}_1 = [\underline{C}_{1long} \quad \underline{C}_{1lat}], \tag{44}$$

$$\underline{C}_{1long} = \tag{45}$$

$$\begin{bmatrix} \frac{X_u}{m} + \frac{X_{\dot{w}}Z_u}{mm_{\dot{w}}} + & \frac{X_w}{m} + \frac{X_{\dot{w}}Z_w}{mm_{\dot{w}}} + & \frac{X_q}{m} + \frac{X_{\dot{w}}(Z_q + mu_0)}{mm_{\dot{w}}} + & 0 \\ K_x(\underline{I}_k^{-1} - \underline{I}^{-1}\underline{C}_{\dot{\nu}})^{-1}\underline{a}_u & K_x(\underline{I}_k^{-1} - \underline{I}^{-1}\underline{C}_{\dot{\nu}})^{-1}\underline{a}_w & K_x(\underline{I}_k^{-1} - \underline{I}^{-1}\underline{C}_{\dot{\nu}})^{-1}\underline{a}_q & \\ \frac{Z_u}{m_{\dot{w}}} - \frac{x_p}{I_y}\left(M_u + \frac{M_w Z_u}{m_{\dot{w}}}\right) + & \frac{Z_w}{m_{\dot{w}}} - \frac{x_p}{I_y}\left(M_w + \frac{M_w Z_w}{m_{\dot{w}}}\right) + & \frac{Z_q + mu_0}{m_{\dot{w}}} - \frac{x_p}{I_y}\left(M_q + \frac{M_w(Z_q + mu_0)}{m_{\dot{w}}}\right) + & 0 \\ K_z(\underline{I}_k^{-1} - \underline{I}^{-1}\underline{C}_{\dot{\nu}})^{-1}\underline{a}_u & K_z(\underline{I}_k^{-1} - \underline{I}^{-1}\underline{C}_{\dot{\nu}})^{-1}\underline{a}_w & K_z(\underline{I}_k^{-1} - \underline{I}^{-1}\underline{C}_{\dot{\nu}})^{-1}\underline{a}_q & \\ K_y(\underline{I}_k^{-1} - \underline{I}\,\underline{C}_{\dot{\nu}})^{-1}\underline{a}_u & K_y(\underline{I}_k^{-1} - \underline{I}\,\underline{C}_{\dot{\nu}})^{-1}\underline{a}_w & K_y(\underline{I}_k^{-1} - \underline{I}\,\underline{C}_{\dot{\nu}})^{-1}\underline{a}_q & 0 \end{bmatrix},$$

$$\underline{C}_{1lat} = \begin{bmatrix} K_x(\underline{I}_k^{-1} - \underline{I}\underline{C}_{\dot{\nu}})^{-1}\underline{a}_\upsilon & K_x(\underline{I}_k^{-1} - \underline{I}\underline{C}_{\dot{\nu}})^{-1}\underline{a}_p & K_x(\underline{I}_k^{-1} - \underline{I}\underline{C}_{\dot{\nu}})^{-1}\underline{a}_r & 0 & 0 \\ K_z(\underline{I}_k^{-1} - \underline{I}\underline{C}_{\dot{\nu}})^{-1}\underline{a}_\upsilon & K_z(\underline{I}_k^{-1} - \underline{I}\underline{C}_{\dot{\nu}})^{-1}\underline{a}_p & K_z(\underline{I}_k^{-1} - \underline{I}\underline{C}_{\dot{\nu}})^{-1}\underline{a}_r & 0 & 0 \\ \frac{Y_\upsilon}{m_{\dot{\upsilon}}} + \frac{x_p}{\Delta}\left(N'_\upsilon + \frac{N'_{\dot{\upsilon}}Y_\upsilon}{m_{\dot{\upsilon}}}\right) + & \frac{Y_p}{m_{\dot{\upsilon}}} + \frac{x_p}{\Delta}\left(N'_p + \frac{N'_{\dot{\upsilon}}Y_p}{m_{\dot{\upsilon}}}\right) + & \frac{Y_r - mu_0}{m_{\dot{\upsilon}}} + \frac{x_p}{\Delta}\left(N'_r + \frac{N'_{\dot{\upsilon}}(Y_r - mu_0)}{m_{\dot{\upsilon}}}\right) + & 0 & 0 \\ K_y(\underline{I}_k^{-1} - \underline{I}^{-1}\underline{C}_{\dot{\nu}})^{-1}\underline{a}_\upsilon & K_y(\underline{I}_k^{-1} - \underline{I}^{-1}\underline{C}_{\dot{\nu}})^{-1}\underline{a}_p & K_y(\underline{I}_k^{-1} - \underline{I}^{-1}\underline{C}_{\dot{\nu}})^{-1}\underline{a}_r & & \end{bmatrix}, \tag{46}$$

-continued $$C_2 = \begin{bmatrix} \frac{X_\varepsilon}{m} + \frac{X_{\dot{w}} Z_\varepsilon}{m m_{\dot{w}}} + \underline{K}_x (I_k - \underline{\Gamma}^{-1} \underline{C}_{\dot{v}})^{-1} (\underline{\Gamma}^{-1} \underline{A}_\varepsilon - \underline{\omega}\underline{\omega}^T) \\ \frac{Z_\varepsilon}{m_{\dot{w}}} - \frac{x_p}{I_y}\left(M_\varepsilon + \frac{M_{\dot{w}} Z_\varepsilon}{m_{\dot{w}}}\right) + \underline{K}_z (I_k - \underline{\Gamma}^{-1} \underline{C}_{\dot{v}})^{-1} (\underline{\Gamma}^{-1} \underline{A}_\varepsilon - \underline{\omega}\underline{\omega}^T) \\ \frac{Y_\varepsilon}{m_{\dot{\upsilon}}} + \frac{x_p}{\Delta}\left(N'_\varepsilon + \frac{N'_{\dot{\upsilon}} Y_\varepsilon}{m_{\dot{\upsilon}}}\right) + \underline{K}_y (I_k - \underline{\Gamma}^{-1} \underline{C}_{\dot{v}})^{-1} (\underline{\Gamma}^{-1} \underline{A}_\varepsilon - \underline{\omega}\underline{\omega}^T) \end{bmatrix}, \quad (47)$$

The matrices $\underline{C}_3$ and $\underline{D}$ are obtained by replacing the index $\varepsilon$ by respectively $\nu$ and $c$. $\underline{H}$ and $\underline{h}(\underline{x}_1)$ are as follows:

$$H = \begin{bmatrix} \frac{X_{\dot{w}} g}{m_{\dot{w}}} & 0 & 0 & 1 & -\frac{X_{\dot{w}}}{m_{\dot{w}}} & 0 & 0 & 0 & 0 & -x_p & -x_p \\ \frac{mg}{m_{\dot{w}}}\left(1 - \frac{x_p M_{\dot{w}}}{I_y}\right) & -g & 0 & 0 & \frac{m}{m_{\dot{w}}}\left(1 - \frac{x_p M_{\dot{w}}}{I_y}\right) & 0 & 0 & 0 & -\frac{x_p}{I_y}(I_z - I_x) & -\frac{x_p I_{zx}}{I_y} & \frac{x_p I_{zx}}{I_y} \\ 0 & 0 & \left(\frac{Y_{\dot{\upsilon}} g}{m_{\dot{\upsilon}}} + \frac{x_p N'_{\dot{\upsilon}} mg}{\Delta m_{\dot{\upsilon}}}\right) & 0 & 0 & \frac{m}{m_{\dot{\upsilon}}}\left(1 + \frac{x_p N'_{\dot{\upsilon}}}{\Delta}\right) & \frac{x_p I_{qr2}}{\Delta} & \frac{x_p I_{pq2}}{\Delta} & 0 & 0 & 0 \end{bmatrix}, \quad (48)$$

$$\underline{h}(\underline{x}_1) = \begin{bmatrix} \cos\theta\cos\phi - 1 \\ \cos\theta\cos\phi \\ \cos\theta\sin\phi \\ -qw + r\upsilon \\ -p\upsilon + q\Delta u \\ -r\Delta u + pw \\ qr \\ pq \\ rp \\ r^2 \\ p^2 \end{bmatrix} \quad (49)$$

The non-linear simulation model described in equation (33) contains an effectiveness matrix $\underline{F}$ which considers the non-linear characteristics of parameters. The effectiveness matrix $\underline{F}$ is stated in equation (42).

Expanding the model by aerodynamic, structural dynamic and aeroelastic non-linearities produces a.) additional entries in the non-linearity vector $\underline{g}(\underline{x}1)$, for example $g_{14}(w) = w^2 + 3w^4$, $g_{15}(\nu) = \nu^2$, $g_{16}(\nu_1) = \nu_1^2$, $g_{17}(\nu_2) = \mathrm{sgn}(\nu_2)$, where sgn is the so-called signum function of mathematics, and b.) additional column $$\begin{bmatrix} \underline{F} \\ \underline{0} \\ \underline{0} \end{bmatrix}$$

matrix from equation (33):

$$\begin{bmatrix} X_{NL,w} & 0 & & \\ Z_{NL,w} & 0 & & \\ 0 & 0 & & \\ 0 & 0 & & \\ \underline{F} & 0 & Y_{NL,\upsilon} & \underline{0} \\ 0 & 0 & & \\ 0 & 0 & & \\ 0 & 0 & & \\ 0 & 0 & & \\ \hline \underline{0} & \underline{0} & & \underline{0} \\ \hline & & 0 & 0 \\ & & 0 & 0 \\ & & D_{NL,1} & 0 \\ & & 0 & 0 \\ \underline{0} & \underline{0} & 0 & D_{NL,2} \\ & & 0 & 0 \\ & & 0 & 0 \\ & & 0 & 0 \\ & & 0 & 0 \end{bmatrix} \quad (50)$$

The quantities $X_{NL,w}$, $Z_{NL,w}$, $Y_{NL,w}$, $D_{NL,1}$ and $D_{NL,2}$ describe the influence strength of the non-linearity.

The non-linear simulation model presented in equation (33) can also be described in a physically more concrete manner (in a generalization of the Newton and Euler motion equations) as follows:

$$M\ddot{x}+D\dot{x}+Kx+Fg(x,\dot{x},p,t)=p$$

where
x=[x_flight mechanics, x_system, x_aeroelastics]
p=[p_gust, p_buffeting, p_pilot,_engine, p_fault]
Fg (x, $\dot{x}$, p, t) contains all non-linearities from flight mechanics, aerodynamics, systems, engine, . . .
and where $M$: Expanded mass matrix $D$: Expanded damping matrix $K$: Expanded rigidity matrix (51)

where p_buffeting is the stochastic pressure as a result of buffeting on structural regions of the aircraft 2.

Since the transformation of equation (33) into the form of equation (50) results in modified vectors x and g (x, $\dot{x}$, p, t) and a modified matrix F, these new vectors and matrices are not underlined.

Equation (51) is a stochastic data model of the aircraft 2. This stochastic model can be stored in the memory 5 of the control means 1. Using the stochastic data model, in particular using equation (51), in a flight testing phase it is possible for a probability to be calculated for each flight phase and for each load station of the aircraft 2 of limit or maximum loads occurring there. In a stochastic simulation, white noise can be used, for example for p-buffeting in equation (51). Furthermore, a pre-adaptation of the parameters of the model, i.e. of equation (51), can be carried out using identification methods, for example a least square method. If, for example due to climatic changes or unforeseeable events, additional flight phases occur which can be described by equation (51), these associated buffeting loads can also be described during the flight using the stochastic model, the tabled amplitudes or degrees of extension of the buffeting load control elements 10 are expanded. If an on-board engineer recognizes, using the output unit 7 for example, that individual parameters of the stochastic simulation model have not been stored accurately enough in the memory 5, in order to reproduce particular flight phases, it is possible for parameters of the model to be adapted via the input unit 6 of the control means 1 such that an extreme or unforeseeable flight state of the aircraft 2 can also be described.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for minimizing buffeting in an aircraft, comprising buffeting load control elements located in airfoils of the aircraft which can be at least partly extended out of the airfoils by a control to reduce buffeting loads acting on the aircraft, wherein the buffeting load control elements are fin-shaped webs, further including flight phase sensors for detecting different flight phases of the aircraft being provided on the aircraft.

2. The system according to claim 1, wherein one or more buffeting load control elements are provided in each case for a structural region of the aircraft structure, in which region a load acting theron is almost constant.

3. A system for minimizing buffeting in an aircraft, comprising buffeting load control elements located in airfoils of the aircraft which can be at least partly extended out of the airfoils by a control to reduce buffeting loads acting on the aircraft, wherein the buffeting load control elements are fin-shaped webs, wherein the control comprises a memory which stores information for different flight phases during a flight operation of the aircraft for all buffeting load control elements of the aircraft concerning whether or not, for each control element, the respective buffeting load control element is to be extended out of the aerofoil of the aircraft during flight operation in the respective flight phase.

4. The system according to claim 1, wherein each buffeting load control element is actuatable between a first retracted position, a second middle, partly extended position and a third fully extended position.

5. A system for minimizing buffeting in an aircraft, comprising buffeting load control elements located in airfoils of the aircraft which can be at least partly extended out of the airfoils by a control to reduce buffeting loads acting on the aircraft, wherein the buffeting load control elements are fin-shaped webs, wherein the buffeting load control element is moved into a second middle, partly extended position when the respective buffeting load control element is to be extended out of the aerofoil in a flight phase of the aircraft.

6. The system according to claim 1, including load sensors provided on the structural regions of the aircraft which detect a current load acting on the respective structural region during the flight operation of the aircraft, and wherein buffeting load control elements provided for the structural region are moved adaptively as a function of the detected load between a second middle, partly extended position and a third fully extended position to minimize the load currently acting by buffeting on the respective structural region.

7. The system according to claim 1, wherein the control includes a calculation unit which calculates degrees of extension for the buffeting load control elements in real time and moves the buffeting load control elements out of the airfoils according to the calculated degrees of extension to minimize buffeting-induced turbulence.

8. The system according to claim 7, wherein the control includes a calculation unit which calculates degrees of extension for the buffeting load control elements in real time and moves the buffeting load control elements out of the airfoils according to the calculated degrees of extension to minimize buffeting-induced turbulence.

9. The system according to claim 1, wherein the airfoils of the aircraft comprise wings and a tailplane and rudder unit of the aircraft.

10. The system according to claim 8, wherein the control surfaces are elevators on the tailplane of the aircraft.

11. The system according to claim 1, wherein calculated during a flight testing phase of the aircraft using a stochastic, non-linear dynamic model of the aircraft and sensorially detected buffeting characteristic quantities for each flight phase and for each structural region of the aircraft affected by buffeting is a probability that a predetermined limit load will be reached during the total operation period of the aircraft in the respective structural region of the aircraft.

12. The system according to claim 11, wherein as a function of the calculated probabilities, a buffeting load control element which reduces a buffeting load on a structural region of the aircraft, the calculated probability of which exceeds a predetermined probability threshold value, is stored as a buffeting load control element in the memory of the control means, which buffeting load control element is to be extended out of the aerofoil during normal flight operation of the aircraft.

\* \* \* \* \*